(12) United States Patent
Yang et al.

(10) Patent No.: US 12,097,428 B2
(45) Date of Patent: Sep. 24, 2024

(54) METHOD AND APPARATUS FOR STATE SWITCHING IN VIRTUAL SCENE, DEVICE, MEDIUM, AND PROGRAM PRODUCT

(71) Applicant: Tencent Technology (Shenzhen) Company Limited, Shenzhen (CN)

(72) Inventors: Zefeng Yang, Shenzhen (CN); Jiaqi Pan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 196 days.

(21) Appl. No.: 17/741,891

(22) Filed: May 11, 2022

(65) Prior Publication Data

US 2022/0266136 A1 Aug. 25, 2022

Related U.S. Application Data

(63) Continuation of application No. PCT/CN2021/123010, filed on Oct. 11, 2021.

(30) Foreign Application Priority Data

Nov. 19, 2020 (CN) .......................... 202011302490.2

(51) Int. Cl.
*A63F 13/52* (2014.01)
*A63F 13/2145* (2014.01)
*A63F 13/537* (2014.01)

(52) U.S. Cl.
CPC ............ *A63F 13/52* (2014.09); *A63F 13/537* (2014.09); *A63F 13/2145* (2014.09)

(58) Field of Classification Search
None
See application file for complete search history.

(56) References Cited

U.S. PATENT DOCUMENTS

2013/0038555 A1 2/2013 Maeda et al.
2015/0238861 A1 8/2015 Inamori
(Continued)

FOREIGN PATENT DOCUMENTS

CN 108984095 A 12/2018
CN 110270086 A 9/2019
(Continued)

OTHER PUBLICATIONS

YouTube video, PUBG Mobile VS Knives Out ! COMPARISON (PlayerUnknown's Battlegrounds VS Knives Out)—https://www.youtube.com/watch?v=F7wcEyQ6Vvk to GamingRfan, Mar. 31, 2019 (Year: 2019).*

(Continued)

*Primary Examiner* — Damon J Pierce
(74) *Attorney, Agent, or Firm* — Crowell & Moring LLP

(57) ABSTRACT

This application provides a method and apparatus for state switching in a virtual scene, a device, computer-readable storage medium, and a computer program product. The method includes: displaying a virtual object in a first motion state in a screen of a virtual scene, the virtual object being equipped with a virtual item, the virtual item being in a first equipment state; and controlling, in response to a first switching instruction for the virtual object, the virtual object to switch an equipment state of the virtual item from the first equipment state to a second equipment state, and controlling a motion state of the virtual object to switch from the first motion state to a second motion state, so that the virtual object that is in the second motion state controls the virtual item that is in the second equipment state.

17 Claims, 14 Drawing Sheets

(56) References Cited

U.S. PATENT DOCUMENTS

2018/0193746 A1     7/2018    Inamori
2019/0091574 A1     3/2019    Wei

FOREIGN PATENT DOCUMENTS

| | | |
|---|---|---|
| CN | 110354489 A | 10/2019 |
| CN | 110893277 A | 3/2020 |
| CN | 111111190 A | 5/2020 |
| CN | 111399639 A | 7/2020 |
| CN | 111589145 A | 8/2020 |
| CN | 111659119 A | 9/2020 |
| CN | 111921190 A | 11/2020 |
| CN | 111921194 A | 11/2020 |
| CN | 111921198 A | 11/2020 |
| CN | 112402960 A | 2/2021 |
| WO | WO2020/207206 A1 | 10/2020 |

OTHER PUBLICATIONS

YouTube video, New! Pubg Mobile vs. Knives Out Updated Comparison (Android) 2018—https://www.youtube.com/watch?v=OyPADDPaycY to AnonymousYT, Apr. 23, 2018 (Year: 2018).*

YouTube video, Rules of Survival vs Knives Out—PUBG Mobile Battle Royale Games (iOS/Android) to Bobby Plays—https://www.youtube.com/watch?v=jIURXa3MSCI, Dec. 18, 2017 (Year: 2017).*

International Search Report and Written Opinion for International Application No. PCT/CN2021/123010, including translation of International Search Report, mailed Jan. 14, 2022 (14 pages).

Chinese Office Action for Chinese Application No. 2020113024902, including English Concise Explanation of Relevance, dated Dec. 31, 2021 (12 pages).

Tieba baidu.com. and concise explanation, https://tieba.baidu.com/p/6467475695, Ref. 1, Jan. 31, 2020 (2 pages).

Tieba baido.com and concise explanation, https://tieba.baidu.com/p/6467475695, Ref. 2, Jan. 31, 2020 (2 pages).

Examination Report No. 1 for Australian application 2021383120, dated Jun. 8, 2023 (4 pages).

Second Office Action for Chinese Application No. 2020113024902, including English Concise Explanation of Relevance dated Jun. 14, 2022 (4 pages).

Examination Report issued in Canadian application 3160737 on Jul. 18, 2023 (3 pages).

Extended European Search Report issued in European application EP21893623.5 on Oct. 19, 2023, 12 pages.

Office Action issued on Korean application KR 10-2022-7016868 on May 16, 2024, with English translation appended, 28 pages.

The legend of Zelda: BotW, YouTube notice moving picture, Apr. 12, 2019.

* cited by examiner

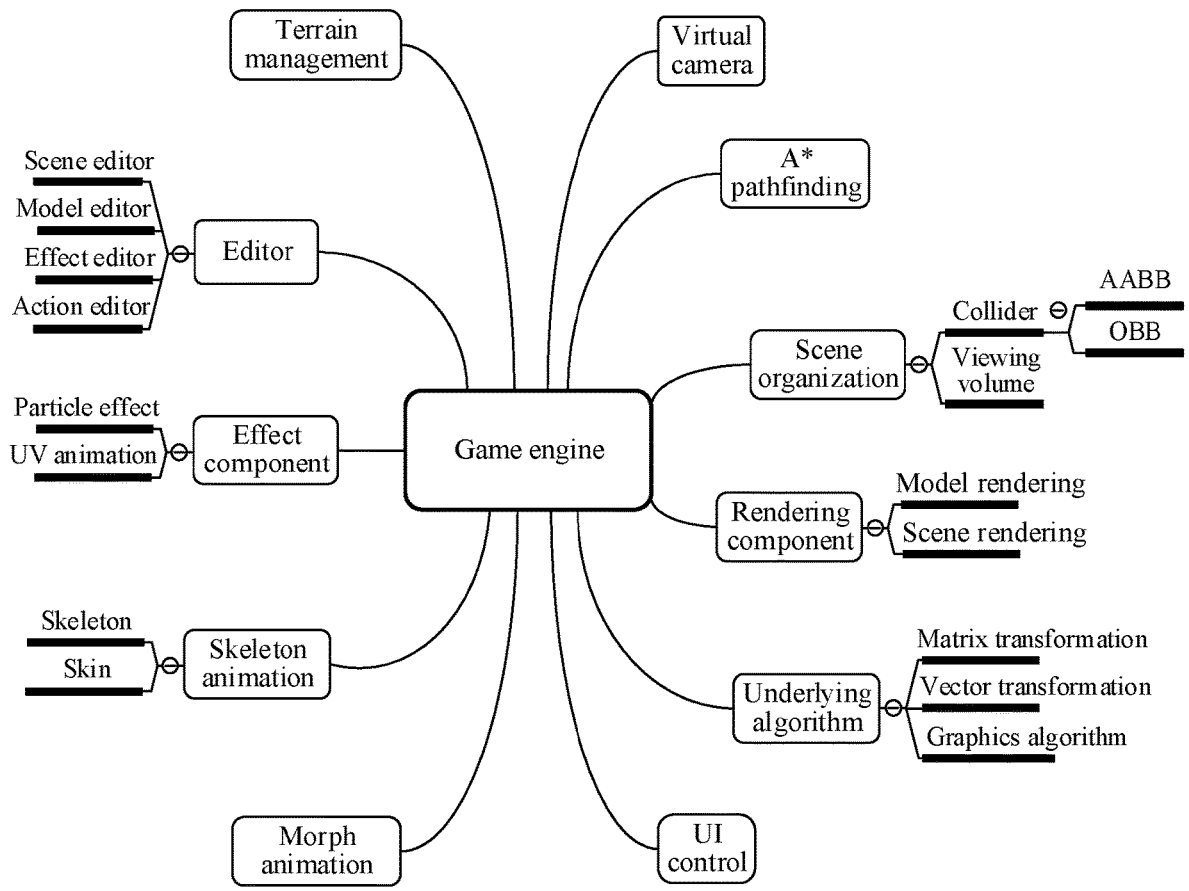

FIG. 3

| A terminal displays a virtual object in a first motion state in a screen of a virtual scene, the virtual object being equipped with a virtual item, the virtual item being in a first equipment state | ⟵ 101 |

| Control, in response to a first switching instruction for the virtual object, the virtual object to switch an equipment state of the virtual item from the first equipment state to a second equipment state, and control a motion state of the virtual object to switch from the first motion state to a second motion state, so that the virtual object that is in the second motion state controls the virtual item that is in the second equipment state | ⟵ 102 |

FIG. 4

METHOD AND APPARATUS FOR STATE SWITCHING IN VIRTUAL SCENE, DEVICE, MEDIUM, AND PROGRAM PRODUCT

RELATED APPLICATION

This application is a continuation of International Application No. PCT/CN2021/123010, filed Oct. 11, 2021, which claims priority to Chinese Patent Application No. 202011302490.2, filed on Nov. 19, 2020. The contents of International Application No. PCT/CN2021/123010 and Chinese Patent Application No. 202011302490.2 are incorporated herein by reference in their entirety.

FIELD OF THE TECHNOLOGY

This application relates to the field of computer human-machine interaction technologies, and in particular, to a method and apparatus for state switching in a virtual scene, a device, computer-readable storage medium, and a computer program product.

BACKGROUND OF THE DISCLOSURE

In an application of a virtual scene, when a motion state of a virtual object in the virtual scene, an equipment state of an equipped virtual item, and the like are switched, in the related art, to switch a plurality of states, a plurality of interactive operations need to be performed. Using the virtual scene being a shooting game as an example, when the virtual object is in a state of holding a virtual item, to increase a running speed, a user needs to click/tap an item bar to store the virtual item and keep an empty-handed state, and then use a directional joystick control to slide into a sprint region to enter a sprinting state. However, such a manner requires two click/tap operations, which are relatively cumbersome, especially when there is a specific operation distance between the item bar and the direction joystick control, which further increases the operation costs, resulting in low efficiency of human-machine interaction.

SUMMARY

Embodiments of this application provide a method and apparatus for state switching in a virtual scene, a device, a computer-readable storage medium, and a computer program product, to control, based on one switching instruction, simultaneous switching of a motion state of a virtual object and an equipment state of a virtual item, thereby improving the efficiency of human-machine interaction.

The technical solutions in the embodiments of this application are implemented as follows:

An embodiment of this application provides a method for state switching in a virtual scene, including:
  displaying a virtual object in a first motion state in a screen of a virtual scene, the virtual object being equipped with a virtual item, the virtual item being in a first equipment state; and
  controlling, in response to a first switching instruction for the virtual object, the virtual object to switch an equipment state of the virtual item from the first equipment state to a second equipment state, and controlling a motion state of the virtual object to switch from the first motion state to a second motion state,
  so that the virtual object that is in the second motion state controls the virtual item that is in the second equipment state.

An embodiment of this application provides an apparatus for state switching in a virtual scene, including:
  a first display module, configured to display a virtual object in a first motion state in a screen of a virtual scene, the virtual object being equipped with a virtual item, the virtual item being in a first equipment state; and
  a first control module, configured to control, in response to a first switching instruction for the virtual object, the virtual object to switch an equipment state of the virtual item from the first equipment state to a second equipment state, and control a motion state of the virtual object to switch from the first motion state to a second motion state,
  so that the virtual object that is in the second motion state controls the virtual item that is in the second equipment state.

An embodiment of this application provides an electronic device, including:
  a memory, configured to store executable instructions; and
  a processor, configured to implement the method for state switching in a virtual scene provided in the embodiments of this application when executing the executable instructions stored in the memory.

An embodiment of this application provides a computer-readable storage medium storing executable instructions, the executable instructions, when executed by a processor, causing the processor to implement the method for state switching in a virtual scene provided in the embodiments of this application.

An embodiment of this application provides a computer program product, including a computer program or instructions, the computer program or the instructions, when executed by a processor, implementing the method for state switching in a virtual scene provided in the embodiments of this application.

The embodiments of this application have the following beneficial effects:

In the application of the embodiments of this application, in response to a first switching instruction for a virtual object, the virtual object is controlled to switch an equipment state of a virtual item from an original first equipment state to a second equipment state, and a motion state of the virtual object is controlled to switch from the first motion state to a second motion state, so that the virtual object that is in the second motion state controls the virtual item that is in the second equipment state. In this way, in event that a terminal receives one switching instruction, simultaneous switching of the motion state of the virtual object and the equipment state of the virtual item can be controlled, which, compared with that each switching instruction can perform a switching operation on only one state, can improve the efficiency of state switching, thereby reducing a quantity of times of interaction required for achieving an interaction objective, improving the efficiency of human-machine interaction, and reducing occupation of hardware processing resources.

BRIEF DESCRIPTION OF THE DRAWINGS

FIG. 3 is a schematic diagram of a principle of installing a human-machine interaction engine in an apparatus for state switching in a virtual scene according to an embodiment of this application.

FIG. 4 is a schematic flowchart of a method for state switching in a virtual scene according to an embodiment of this application.

DESCRIPTION OF EMBODIMENTS

Figure 1:
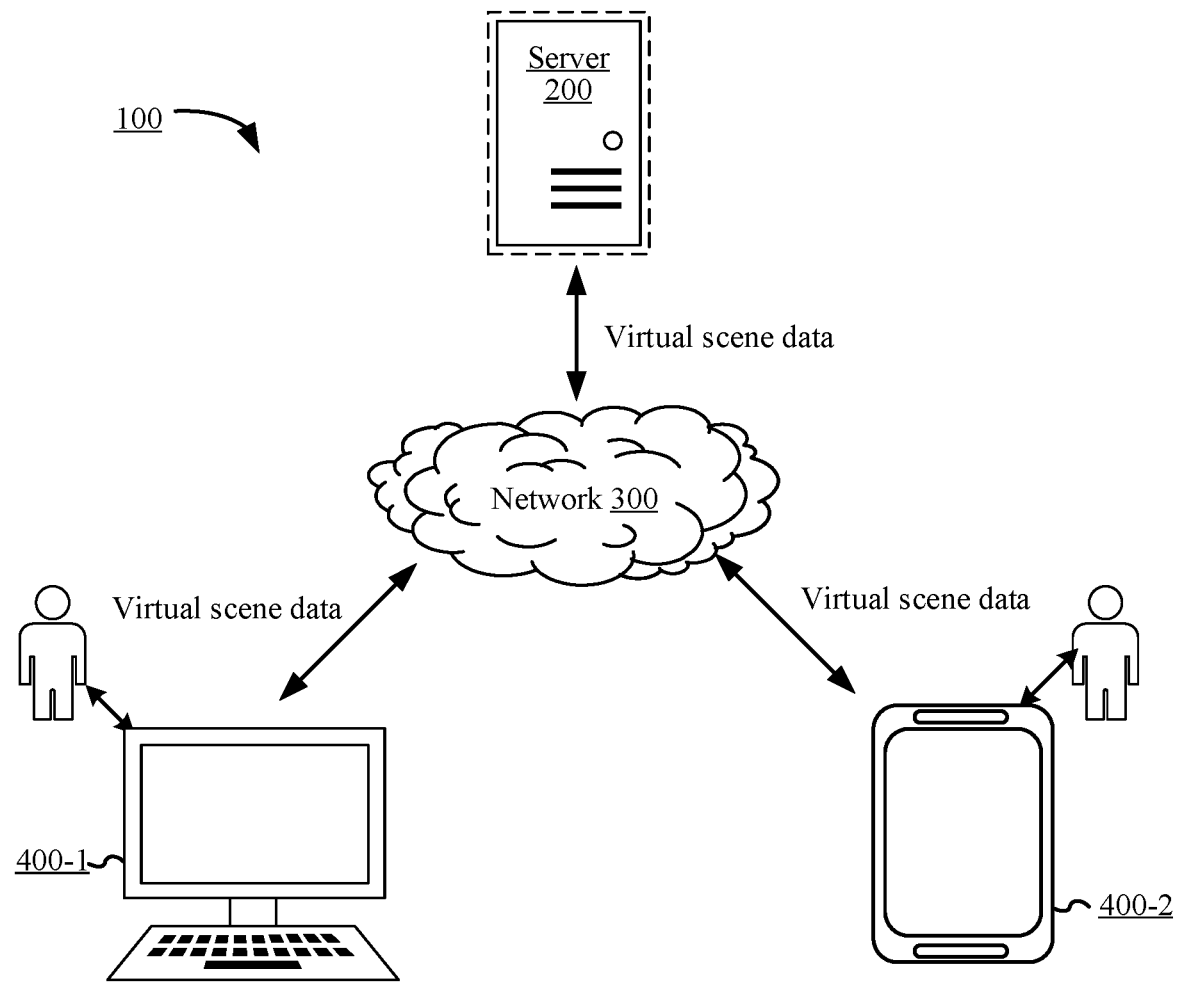
FIG. 1 is a schematic architectural diagram of a system for state switching in a virtual scene according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, the term "some embodiments" describes subsets of all possible embodiments, but it may be understood that "some embodiments" may be the same subset or different subsets of all the possible embodiments, and can be combined with each other without conflict.

In the following descriptions, the included term "first/second" is merely intended to distinguish similar objects but does not necessarily indicate a specific order of an object. It may be understood that "first/second" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, a description is made on terms in the embodiments of this application, and the terms in the embodiments of this application are applicable to the following explanations.

1) Client: an application program run on a terminal and configured to provide various service, for example, a video playback client or game client.

2) "In response to": used for representing a condition or status on which one or more to-be-performed operations depend. When the condition or status is satisfied, the one or more operations may be performed in real time or after a set delay. Unless explicitly stated, there is no limitation on the order in which the plurality of operations are performed.

3) Virtual scene: a virtual scene displayed (or provided) when an application program is run on a terminal. The virtual scene may be a simulated environment of a real world, or may be a semi-simulated semi-fictional virtual environment, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of this application. For example, the virtual scene may include the sky, the land, the ocean, or the like. The land may include environmental elements such as the desert and a city. The user may control the virtual object to move in the virtual scene.

4) Virtual object: images of various persons and items that can interact with each other in a virtual scene or a movable object in a virtual scene. The movable object may be a virtual person, a virtual animal, a cartoon person, or the like, for example, a character, an animal, a plant, an oil drum, a wall, or a stone displayed in a virtual scene. The virtual object may be a virtual image used for representing a user in the virtual scene. The virtual scene may include a plurality of virtual objects, and each virtual object has a shape and a volume in the virtual scene, and occupies some space in the virtual scene.

Optionally, the virtual object may be a player character controlled through an operation on a client, or may be an artificial intelligence (AI) character set in a virtual scene battle through training, or may be a non-player character (NPC) set in virtual scene interaction. Optionally, the virtual object may be a virtual person for adversarial interaction in a virtual scene. Optionally, a quantity of virtual objects participating in the interaction in the virtual scene may be preset, or may be dynamically determined according to a quantity of clients participating in the interaction.

Using a shooting game as an example, the user may control the virtual object to, in the virtual scene, descend freely, glide, parachute, or the like in the sky, or run, jump, crawl, stoop to move forward, or the like on the land, or control the virtual object to swim, float, dive, or the like in the ocean. Certainly, the user may alternatively control the virtual object to drive a virtual vehicle to move in the virtual scene. For example, the virtual vehicle may be a virtual automobile, a virtual aircraft, a virtual yacht, or the like. The foregoing scene is merely used as an example for description, which is not specifically limited in the embodiments of this application. The user may alternatively control the virtual object to perform adversarial interaction with another virtual objects using the virtual item. For example, the virtual item can be a throwing virtual item such as a grenade, a cluster mine, or a sticky grenade, or a shooting virtual item such as a machine gun, a pistol, or a rifle. A type of the virtual item is not specifically limited in this application.

5) Scene data: various features presented by an object in a virtual scene in an interaction process, which, for example, may include a position of the object in the virtual scene. Certainly, different types of features may be included according to a type of a virtual scene. For example, in a virtual scene of a game, scene data may include times that need to be waited for when various functions are configured in the virtual scene (depending on a quantity of times a same function can be used in a specific time), and may further represent attribute values of a game character in various states, for example, include a hit point value (also referred to as an amount of red) and a mana value (also referred to as an amount of blue).

FIG. 1 is a schematic architectural diagram of a system 100 for state switching in a virtual scene according to an embodiment of this application. To support an exemplary application, terminals (exemplarily, a terminal 400-1 and a terminal 400-2) are connected to a server 200 by a network 300. The network 300 may be a wide area network, a local area network, or a combination of the two. Data transmission is implemented by using a wireless or wired link.

The terminal may be various types of user terminals such as a smartphone, a tablet computer, or a notebook computer, and may alternatively be a desktop computer, a game console, a TV, an in-vehicle terminal, or a combination of any two or more of the data processing devices. The server 200 may be a server that is configured independently and that supports various services, or may be configured as a server cluster, or may be a cloud server or the like.

In an actual application, an application program that supporting a virtual scene is installed and run on the terminal. The application program may be one of a first-person shooting game (FPS), a third-person shooting game, a multiplayer online battle arena (MOBA) game, a massive multiplayer online (MMO) game, a two-dimensional (2D for short) game application, a three-dimensional (3D for short) game application, a virtual reality application program, a three-dimensional map program, a military simulation program, or a multiplayer shootout survival game. The application program may alternatively be a standalone version of an application program, for example, the standalone version of a 3D game program. The user may the terminal to control a virtual object to perform activities in the virtual scene. The activities include, but are not limited to, at least one of adjusting a body posture, crawling, running, riding, jumping, driving, picking, shooting, attacking, throwing, or cutting. For example, the virtual object is a virtual person such as a simulated person character or a cartoon person character.

In an exemplary scenario, a first virtual object controlled by a first terminal 400-1 and a second virtual object controlled by a second terminal 400-2 are located in a same virtual scene, and in this case, the first virtual object may interact with the second virtual object in the virtual scene. In some embodiments, the first virtual object and the second virtual object may be in an alliance relationship. For example, the first virtual object and the second virtual object belong to a same team and organization, and in the virtual scene, there is also a virtual object that is in an adversarial relationship with the first virtual object. Virtual objects in an adversarial relationship may perform adversarial interaction on the land in a manner of shooting each other.

Using an electronic game scene as an exemplary scene, a user may perform an operation on the terminal in advance, and the terminal may download a game configuration file of an electronic game after detecting the operation of the user. The game configuration file may include an application program, interface display data, virtual scene data, or the like of the electronic game, so that the game configuration file can be invoked when the user logs in to the electronic game on the terminal, to render and display an electronic game interface. The user may perform a touch operation on the terminal, and after detecting the touch operation, the terminal may determine game data corresponding to the touch operation and render and display the game data. The game data may include virtual scene data, behavioral data of a virtual object in the virtual scene, and the like.

In an actual application, when entering the virtual scene, the terminal transmits a request for obtaining scene data of the virtual scene to the server 200, and the server obtains and returns the scene data of the virtual scene to the terminal based on the received request for obtaining the scene data. The terminal receives the scene data of the virtual scene, renders a screen of the virtual scene based on the scene data, and displays a virtual object in a first motion state in the screen of the virtual scene, the virtual object being equipped with a virtual item, the virtual item being in a first equipment state; and controls, in response to a first switching instruction for the virtual object, the virtual object to switch an equipment state of the virtual item from the first equipment state to a second equipment state, and controls a motion state of the virtual object to switch from the first motion state to a second motion state, so that the virtual object that is in the second motion state controls the virtual item that is in the second equipment state.

Using a military virtual simulation application as an exemplary scene, a virtual scene technology is adopted to enable a trainee to experience a real battlefield environment visually and audibly, get familiar with environmental features of a combat region, and interact with objects in the virtual environment using a necessary device. A method of implementing a virtual battlefield environment may be creating a dangerous, almost real stereo battle field environment through background generation and image synthesis by using a corresponding three-dimensional battle field environment graphic image library, including combat backgrounds, battlefield scenes, various weapons and equipment, combatants, and the like.

During actual implementation, when entering the virtual scene, the terminal transmits a request for obtaining scene data of the virtual scene to the server 200, and the server obtains and returns the scene data of the virtual scene to the terminal based on the received request for obtaining the scene data. The terminal receives the scene data of the virtual scene, renders a screen of the virtual scene based on the scene data, and displays a virtual object (for example, a simulated combatant) in a first motion state in the screen of the virtual scene, the virtual object being equipped with a virtual item, the virtual item being in a first equipment state; and controls, in response to a first switching instruction for the virtual object, the virtual object to switch an equipment state of the virtual item from the first equipment state to a second equipment state, and controls a motion state of the virtual object to switch from the first motion state to a second motion state, so that the virtual object that is in the second motion state controls the virtual item that is in the second equipment state.

Figure 2:
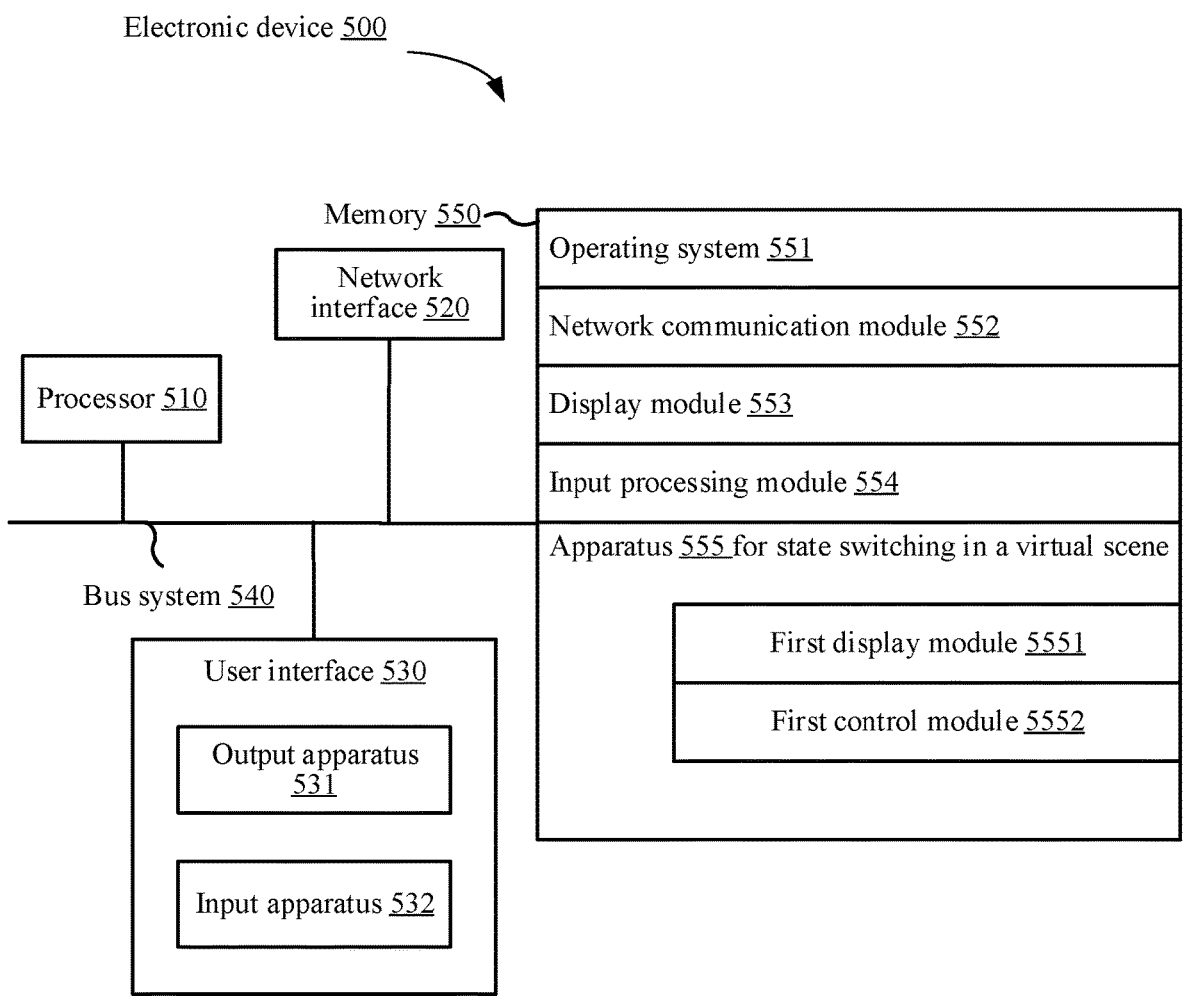
FIG. 2 is a schematic structural diagram of an electronic device according to an embodiment of this application.

FIG. 2 is a schematic structural diagram of an electronic device 500 according to an embodiment of this application. In an actual application, the electronic device 500 may be the terminal 400-1, the terminal 400-2, or the server in FIG.

1. Using the electronic device being the terminal 400-1 or the terminal 400-2 shown in FIG. 1 as an example, a computer device implementing the method for state switching in a virtual scene according to an embodiment of this application is described. The electronic device 500 shown in FIG. 2 includes at least one processor 510, a memory 550, at least one network interface 520, and a user interface 530. All the components in the electronic device 500 are coupled together by using a bus system 540. It may be understood that the bus system 540 is configured to implement connection and communication between the components. In addition to a data bus, the bus system 540 further includes a power bus, a control bus, and a status signal bus. However, for ease of clear description, all types of buses are marked as the bus system 540 in FIG. 2.

The processor 510 may be an integrated circuit chip having a signal processing capability, for example, a general purpose processor, a digital signal processor (DSP), or another programmable logic device, discrete gate, transistor logical device, or discrete hardware component. The general purpose processor may be a microprocessor, any conventional processor, or the like.

The user interface 530 includes one or more output devices 531 that enable presentation of media content, including one or more speakers and/or one or more visualization display screens. The user interface 530 further includes one or more input apparatuses 532, including user interface components that facilitate inputting of a user, such as a keyboard, a mouse, a microphone, a touch display screen, a camera, and other input buttons and controls.

The memory 550 may be a removable memory, a non-removable memory, or a combination thereof. Exemplary hardware devices include a solid-state memory, a hard disk drive, an optical disc driver, or the like. The memory 550 optionally includes one or more storage devices physically away from the processor 510.

The memory 550 includes a volatile memory or a non-volatile memory, or may include a volatile memory and a non-volatile memory. The non-volatile memory may be a read-only memory (ROM). The volatile memory may be a random access memory (RAM). The memory 550 described in this embodiment of this application is to include any other suitable type of memories.

In some embodiments, the memory 550 may store data to support various operations. Examples of the data include programs, modules, and data structures, or a subset or a superset thereof, which are illustrated below.

An operating system 551 includes a system program configured to process various basic system services and perform a hardware-related task, for example, a framework layer, a core library layer, and a driver layer, and is configured to implement various basic services and process a hardware-related task.

A network communication module 552 is configured to reach another computing device through one or more (wired or wireless) network interfaces 520. Exemplary network interfaces 520 include: Bluetooth, wireless compatible authentication (Wi-Fi), a universal serial bus (USB), and the like.

A display module 553 is configured to display information by using an output apparatus 531 (for example, a display screen or a speaker) associated with one or more user interfaces 530 (for example, a user interface configured to operate a peripheral device and display content and information).

An input processing module 554 is configured to detect one or more user inputs or interactions from one of the one or more input apparatuses 532 and translate the detected input or interaction.

In some embodiments, the apparatus for state switching in a virtual scene provided in this embodiment of this application may be implemented in the form of software. FIG. 2 shows an apparatus 555 for state switching in a virtual scene stored on the memory 550, which may be software in the form of a program, a plug-in, or the like, and includes the following software modules: a first display module 5551 and a first control module 5552. The modules are logical modules, and may be randomly combined or further divided based on to-be-implemented function. The following describes functions of the modules.

In some embodiments, a human-machine interaction engine configured to implement the method for state switching in a virtual scene is installed on the apparatus 555 for state switching in a virtual scene. The human-machine interaction engine includes functional modules, components, or plug-ins configured to implement the method for state switching in a virtual scene. FIG. 3 is a schematic diagram of a principle of installing a human-machine interaction engine in an apparatus for state switching in a virtual scene according to an embodiment of this application. Referring to FIG. 3, using the virtual scene being a game scene as an example, correspondingly, the human-machine interaction engine is a game engine.

A game engine is a code (instruction) set that is designed for a machine running a specific type of game and that can be identified by the machine, is like an engine, and controls running of the game. A game program can be divided into two parts: a game engine and a game resource. The game resource includes parts such as images, sounds, and animations. Game=engine (program code)+resource (images, sounds, animations, and the like). The game engine invokes the resources sequentially according to designed requirements of the game.

The method for state switching in a virtual scene provided in this embodiment of this application can be implemented by modules in the apparatus for state switching in a virtual scene shown in FIG. 2 by invoking related modules, components, or plug-ins of the game engine shown in FIG. 3. The modules, components, or plug-ins included in the game engine shown in FIG. 3 are exemplarily described below.

1) A virtual camera is a necessary component to a game scene screen, and is configured to display the game scene screen. One game scene corresponds to at least one virtual camera. According to actual needs, there may be two or more virtual cameras that serve as windows for game rendering and that capture and display screen content of the game world for the player. A perspective, for example, a first-person perspective or third-person perspective, from which the player views the game world can be adjusted by setting parameters of the virtual camera.

2) Scene organization is used for game scene management, for example, collision detection and visibility culling. The collision detection may be implemented by using a collider. According to actual needs, the collider may be implemented by using an axis-aligned bounding box (AABB) or by using an oriented bounding box (OBB). The visibility culling can be implemented based on a viewing volume. The viewing volume is a stereo frame generated according to the virtual camera, and configured to crop an object outside a visual range of the camera. An object inside the viewing volume is projected to a view plane, and an object outside the viewing volume is discarded without being processed.

3) For terrain management, a component that performs terrain management in a game scene is configured to create and edit a game terrain, for example, create a terrain, such as a mountain, a canyon, or a cave, in the game scene.

4) An editor is an auxiliary tool in game designing and includes:
  a scene editor, configured to edit game scene content, for example, change a terrain or customize a vegetation distribution or a lighting layout;
  a model editor, configured to produce and edit a model in the game (a character model in the game scene);
  an effect editor, configured to edit an effect in the game screen; and
  an action editor, configured to define and edit an action of a character in the game screen.

5) An effect component is configured to produce and edit a game effect in a game screen, which, in an actual application, can be implemented by using a particle effect and a texture UV animation. The particle effect is to combine countless individual particles to cause them to present a fixed shape, and control their overall or individual movements by using a controller or a script, to simulate an effect, such as water, fire, fog, or gas, in reality. The UV animation is a texture animation implemented by dynamically modifying UV coordinates of a tile.

6) A skeletal animation is an animation implemented by using built-in bones to drive an object to move. The skeletal animation can be understood as the following two concepts:
  Skeleton: an abstract concept used to control skin, for example, a human skeleton controlling skin.
  Skin: a factor that is controlled by a skeleton and that is externally displayed, for example, human skin affected by a skeleton.

7) A Morph animation, that is, deformation animation, is an animation implemented by adjusting vertices of a basic model.

8) A UI control is a control configured to display a game screen.

9) An underlying algorithm is an algorithm that needs to be called for implementing a function in a game engine, for example, a graphics algorithm that is required for implementing scene organization or matrix transformation and vector transformation that are required for implementing a skeletal animation.

10) A rendering component is a component that is necessary for displaying a game screen effect. A scene described using three-dimensional vectors is converted into a scene described using two-dimensional pixels through the rendering component, which includes model rendering and scene rendering.

11) A* pathfinding is an algorithm for finding the shortest path used in path planning, pathfinding, and graph traversal in game designing.

Next, the method for state switching in a virtual scene provided by this embodiment of this application will be described. In actual implementation, the method for state switching in a virtual scene provided by this embodiment of this application may be implemented by a server or a terminal alone or may be implemented collaboratively by a server and a terminal.

FIG. 4 is a schematic flowchart of a method for state switching in a virtual scene according to an embodiment of this application. The method for state switching in a virtual scene is implemented by a terminal alone, which is described with reference to the steps shown in FIG. 4.

Step 101: A terminal displays a virtual object in a first motion state in a screen of a virtual scene, the virtual object being equipped with a virtual item, the virtual item being in a first equipment state.

In an actual application, an application program supporting a virtual scene is installed on the terminal. When a user opens the application program on the terminal, and the terminal runs the application program, the terminal displays a screen of the virtual scene. The screen of the virtual scene herein may be obtained by observing the virtual scene from a first-person object perspective, or may be obtained by observing the virtual scene from a third-person perspective. The screen of the virtual scene includes an interactive object and an interactive environment of the object. For example, a first virtual object and a second virtual object that are in an adversarial relationship interact with each other in the virtual scene.

The user may operate, by using the terminal, a virtual object located in the virtual scene to perform a movement. The movement includes, but is not limited to, at least one of adjusting a body posture, crawling, walking, running, riding, jumping, attacking, throwing, or tackling, so that the virtual object is in a corresponding motion state. In addition, the first motion state may alternatively be a static state. Schematically, the virtual object is a virtual person such as a simulated person character or a cartoon person character. The virtual object may be in any one of the foregoing motion states.

In a process of controlling the movement of the virtual object in the virtual scene, the user may further control the virtual object to be equipped with a corresponding virtual item. Different types of virtual items correspond to different equipment states. For example, when the virtual item is a shooting virtual item such as machine gun, a pistol, or a rifle, a corresponding equipment state may be a holding state, an aiming state, a firing state, or a storage state. In another example, when the virtual item is a throwing virtual item such as a grenade, a cluster mine, or a sticky grenade, a corresponding equipment state is a holding state, a throwing state, or a storage state. The so-called storage state means that the virtual object is controlled to carry the corresponding virtual item on the back or place it in a backpack, so that the virtual object cannot be controlled to use a virtual item in the storage state. Certainly, in addition, the virtual item may alternatively be another type of item, Correspondingly, the equipment state may be a corresponding state of a corresponding virtual item. The type of the virtual item and the configuration state of the virtual item are not specifically limited in this application.

In some embodiments, before the terminal displays a virtual object in a first motion state in a screen of a virtual scene, the virtual object can be controlled in the following manner to be in the first motion state:
  displaying a direction joystick control in the screen of the virtual scene; obtaining, in response to a drag operation on the direction joystick control, a drag position corresponding to the drag operation; and controlling, in response to the drag position being located at a target position, the virtual object to be in the first motion state.

The direction joystick control is configured to control a movement direction and a motion state of the virtual object. The target position is a position used for triggering the virtual object to be in the first motion state. Regardless of a specific drag path along which the direction joystick control is dragged, the virtual object can be controlled to be in the first motion state provided that the drag position corresponding to the drag operation is located at the target position.

When the user drags the direction joystick control to the target position, a control instruction for the motion state of the virtual object can be triggered, to control the virtual object to move in the first motion state. Otherwise, another operation is performed. For example, the virtual object is controlled to move in another motion state. For example, in an actual application, the first motion state may be any one of the motion states such as a crawling state, a walking state, a running state, a riding state, a jumping state, or a tackling state. The another motion state is a state different from the first motion state.

Figure 5:
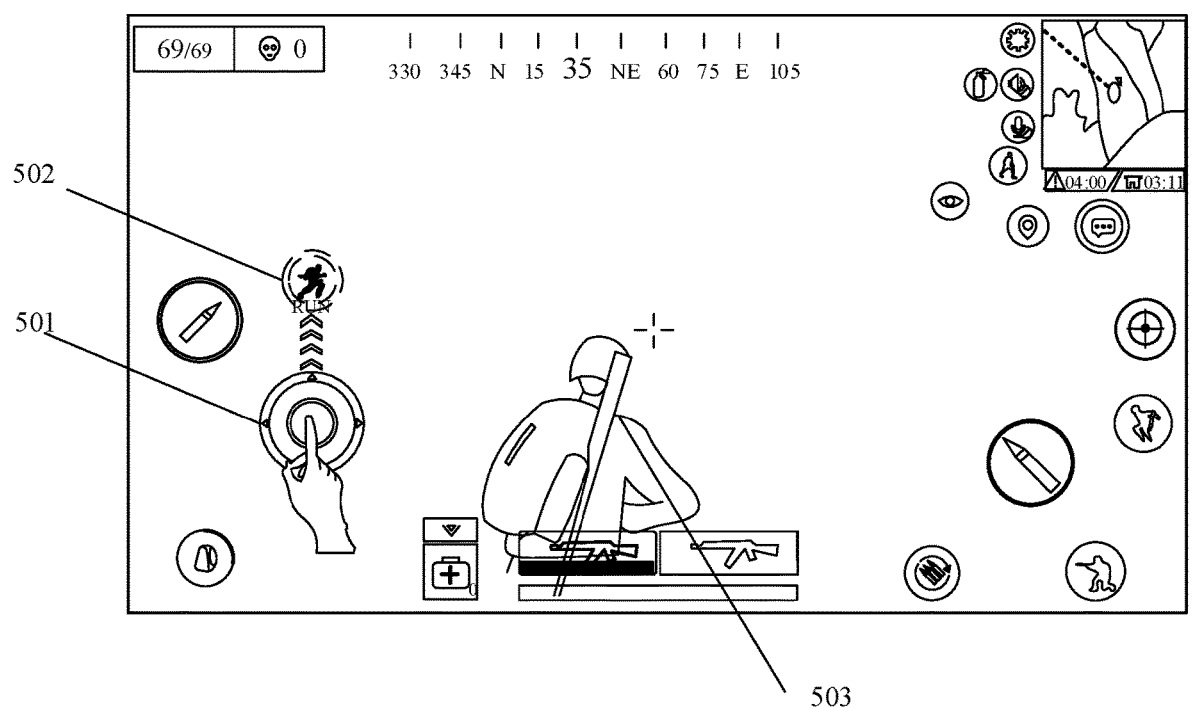
FIG. 5 is a schematic diagram of a state display interface of a virtual scene according to an embodiment of this application.

For example, FIG. 5 is a schematic diagram of a state display interface of a virtual scene according to an embodiment of this application. When a user drags a direction joystick control 501 upward to a target position 502, the terminal controls, in response to a drag operation on the direction joystick control, a virtual object 503 to be in a walking state, and controls the virtual object 503 to hold a virtual item in a walking process. In this case, a motion state of the virtual object 503 is the walking state, and an equipment state of the virtual item with which the virtual object 503 is equipped is the holding state.

In some embodiments, before displaying a virtual object in a first motion state in a screen of a virtual scene, the terminal may alternatively display a direction joystick control in the screen of the virtual scene; determine, in response to a drag operation for the direction joystick control, a drag direction and a drag distance indicated by the drag operation; and control, in response to the drag direction being consistent with a target drag direction, and the drag distance reaching a target distance, the virtual object to be in the first motion state.

During actual implementation, the target drag direction and the drag distance may alternatively be preset. Prompt information corresponding to the target drag direction and the drag distance may be displayed in the screen of the virtual scene, to instruct the user to perform a corresponding drag operation. In event that the drag distance is determined, the terminal obtains a starting position and an end position of the drag operation triggered by the user. The starting position (that is, a position at which the user touches the direction joystick control) and the end position (that is, a position at which the user releases the direction joystick control) of the drag operation can be recorded in the form of coordinates. Then, the drag distance of the drag operation is determined based on the starting position and the end position. The drag distance is compared with the target distance. If the drag distance reaches the target distance, a control instruction for the motion state of the virtual object may be triggered, to control the virtual object to move in the first motion state. Otherwise, another operation is performed. For example, the virtual object is controlled to be in another motion state different from the first motion state, to move in the another motion state.

Step 102: Control, in response to a first switching instruction for the virtual object, the virtual object to switch an equipment state of the virtual item from the first equipment state to a second equipment state, and control a motion state of the virtual object to switch from the first motion state to a second motion state, so that the virtual object that is in the second motion state controls the virtual item that is in the second equipment state.

The second equipment state is an equipment state of the virtual item that can be controlled by the virtual object in the second motion state. That is, the virtual object that is in the second motion state can control or use the virtual item that is in the second equipment state to perform a corresponding operation. Alternatively, the virtual object that is in the second motion state controls the virtual item to be in the second equipment state. For example, if the second motion state is a walking state and the second equipment state is a holding state, the virtual object that is in the walking state can control the virtual item that is in the holding state to perform an operation such as aiming or shooting. In another example, if the first motion state is a running state and the second equipment state is a storage state, the virtual object that is in the running state controls the virtual item that is in the storage state to keep the storage state, thereby increasing the running speed.

In an actual application, the first motion state is different from a second motion state, and the first equipment state is also different from a second equipment state. For example, if the virtual object that is in a walking state holds the virtual item, and the terminal receives a first switching instruction, the terminal controls, in response to the first switching instruction, the virtual object to switch from the walking state (that is, the first motion state) to a crouching state (that is, the second motion state), and controls the virtual object to use the virtual item to shoot an enemy, that is, switch the equipment state of the virtual item from a holding state (that is, the first equipment state) to a firing state (that is, the second equipment state). In another example, if the virtual object is in an empty-handed and ready-to-fight state, and the terminal receives a first switching instruction, the terminal controls, in response to the first switching instruction, the virtual object to hold the virtual item to fight against another object, that is, controls the motion state of the virtual item to switch from a ready-to-fight state (that is, the first motion state) to a fighting state (that is, the second motion state), and controls the virtual item to switch from a storage state (that is, the first equipment state, where "empty-handed" represents that the virtual object does not hold a virtual item) to a holding state (that is, the first equipment state, for example, "knife-holding and fighting", which represents that the virtual object holds a virtual item, that is, a knife).

An execution order of the two switching operations performed by the terminal in response to first switching instruction is not limited to be sequential. For example, the switching operation of switching the equipment state of the virtual item from the first equipment state to the second equipment state can be performed first, and then, the switching operation of switching the motion state of the virtual object from the first motion state to the second motion state is performed, or vice versa. Alternatively, the two switching operations are performed simultaneously.

In some embodiments, before controlling the virtual object to switch the equipment state of the virtual item from the first equipment state to the second equipment state, the terminal may receive the first switching instruction for the virtual object in the following manner: displaying a state switching control for the virtual object; and receiving the first switching instruction for the virtual object in response to a trigger operation on the state switching control.

The state switching control herein is a function icon or key that can switch the motion state of the virtual object and the equipment state of the virtual item in the virtual scene. The state switching control may be displayed in the screen of the virtual scene in a suspended manner. A trigger operation on the state switching control may be an operation, such as a click-tap operation, a press-and-hold operation, or a slide operation, on the state switching control, and a specific form of the trigger operation is not limited in this application.

Figure 6:
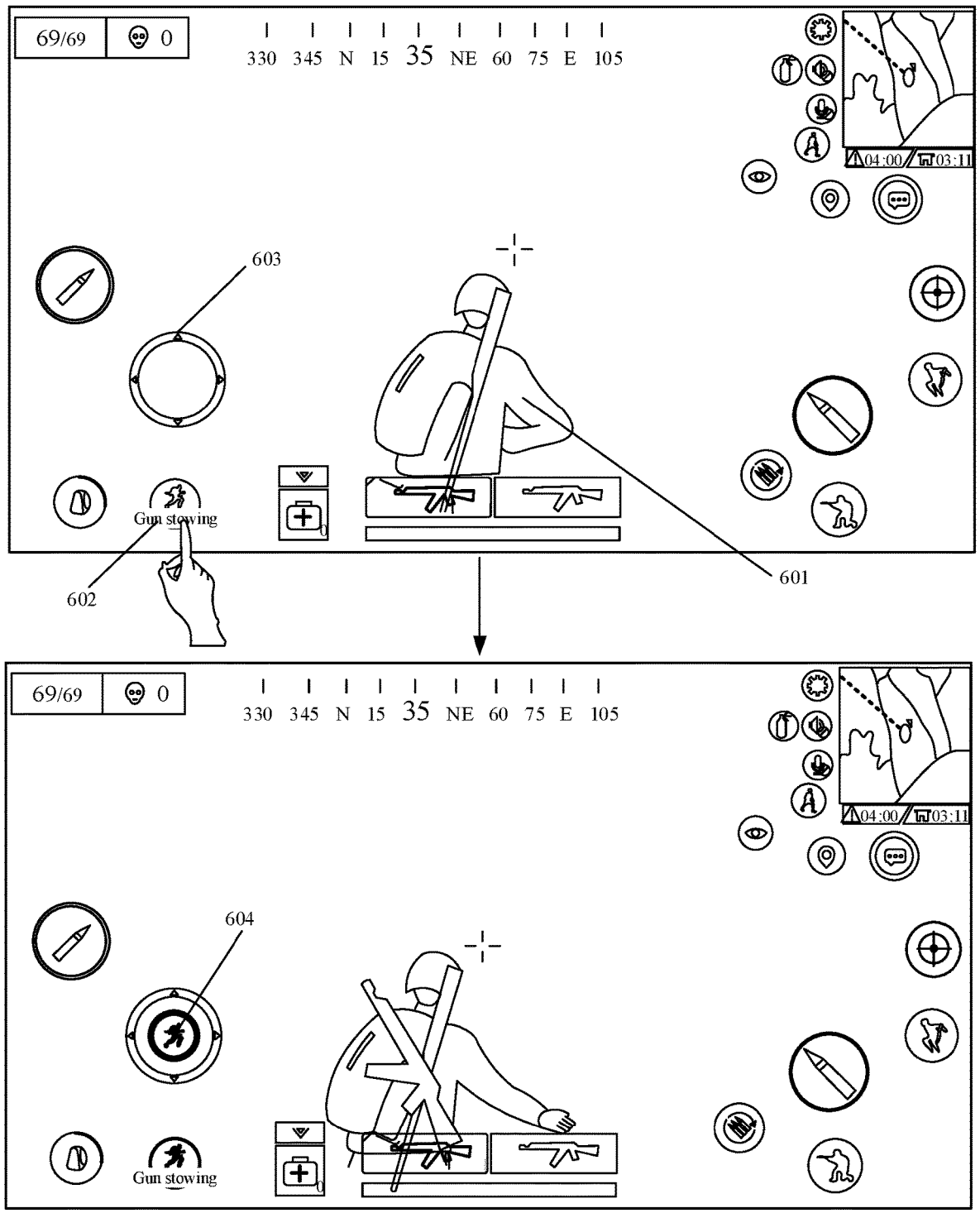
FIG. 6 is a schematic diagram of a display interface of a virtual scene according to an embodiment of this application.

FIG. 6 is a schematic diagram of a display interface of a virtual scene according to an embodiment of this application. Before a switching operation, a virtual object 601 is in a "gun-holding and walking state" in a virtual scene, that is, the first motion state is a walking state and the first equipment state is a holding state. When a user triggers a state switching control 602, the terminal controls, in response to a first switching instruction triggered by the trigger operation, the virtual object 601 to switch from the "gun-holding and walking state" to a "gun-stowing and sprinting state", that is, controls the virtual object 601 to switch from the walking state to a sprinting state (a second motion state), and controls an equipment state of a virtual item (that is, a gun) to switch from the holding state to a storage state (a second equipment state, that is, controls the virtual object to stow the gun and carry the gun on the back). In this way, the virtual object does not need to hold the virtual item, which can increase the running speed.

In some embodiments, the terminal may display a state switching control for the virtual object in the following manner: displaying, in the screen of the virtual scene, the direction joystick control configured to control the motion state of the virtual object and the equipment state of the virtual item; and displaying, in response to the drag operation on the direction joystick control, the state switching control for the virtual object when a drag distance corresponding to the drag operation reaches a target distance.

The direction joystick control herein is configured to control the motion state of the virtual object and the equipment state of the virtual item with which the virtual object is equipped. During actual implementation, the user may trigger, through a drag operation on the direction joystick control, to display a corresponding state switching control.

Figure 7:
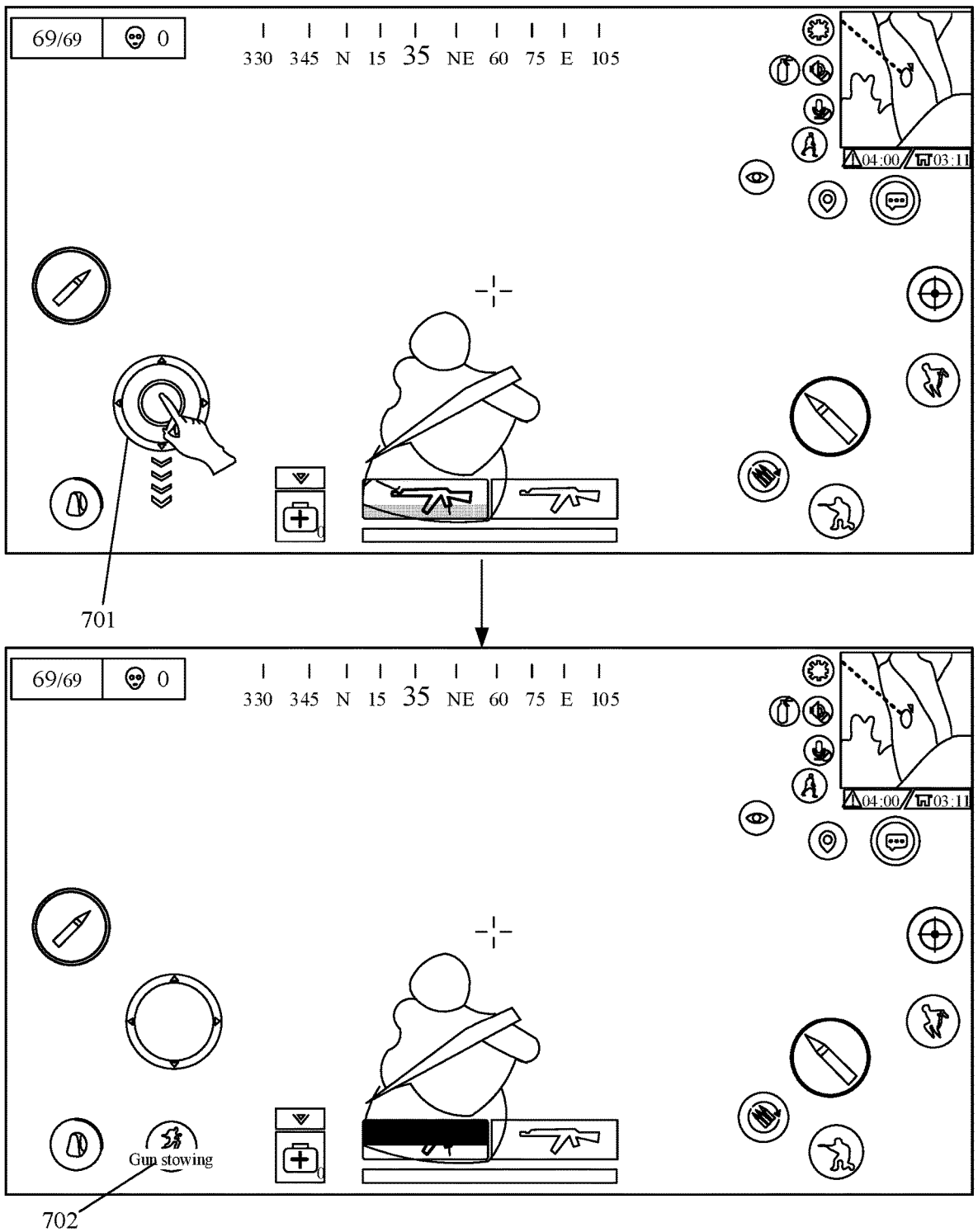
FIG. 7 is a schematic diagram of triggering a state switching control in a virtual scene according to an embodiment of this application.

FIG. 7 is a schematic diagram of triggering a state switching control in a virtual scene according to an embodiment of this application. When a user drags a direction joystick control 701 to the target position, a state switching control 702 for the virtual object is displayed in the screen of the virtual scene, the user may trigger the state switching control 702 to switch the motion state of the virtual object and the equipment state of an equipped virtual item.

In some embodiments, the terminal may alternatively display a state switching control for the virtual object in the following manner: displaying an achievement obtained by the virtual object in the virtual scene; and displaying the state switching control for the virtual object in a case that the achievement reaches an achievement threshold.

The achievement herein may be task points obtained by the virtual object by doing a task in the virtual scene, or an obtained virtual resource value, or a motion value reached by the virtual object moving in the virtual scene in the first motion state, for example, a walking mileage value reached in a walking state in event that the first motion state is the walking state. Only when the achievement obtained by the virtual object in the virtual scene satisfies a condition for switching the motion state of the virtual object and the equipment state of the equipped virtual item, the state switching control is displayed in the screen of the virtual scene for the user to trigger the control to implement the switching operation. For example, when a score obtained by the virtual object in the virtual scene reaches a target score, or the obtained virtual resource value reaches a target resource value, or the walking mileage reaches a target mileage, the corresponding state switching control is displayed. In this way, the condition for using the state switching control is satisfied as soon as possible, which is beneficial to stimulating the passion of the user to control the virtual object to interact or move, thereby improving the activity of the user in the virtual scene.

Figure 8:
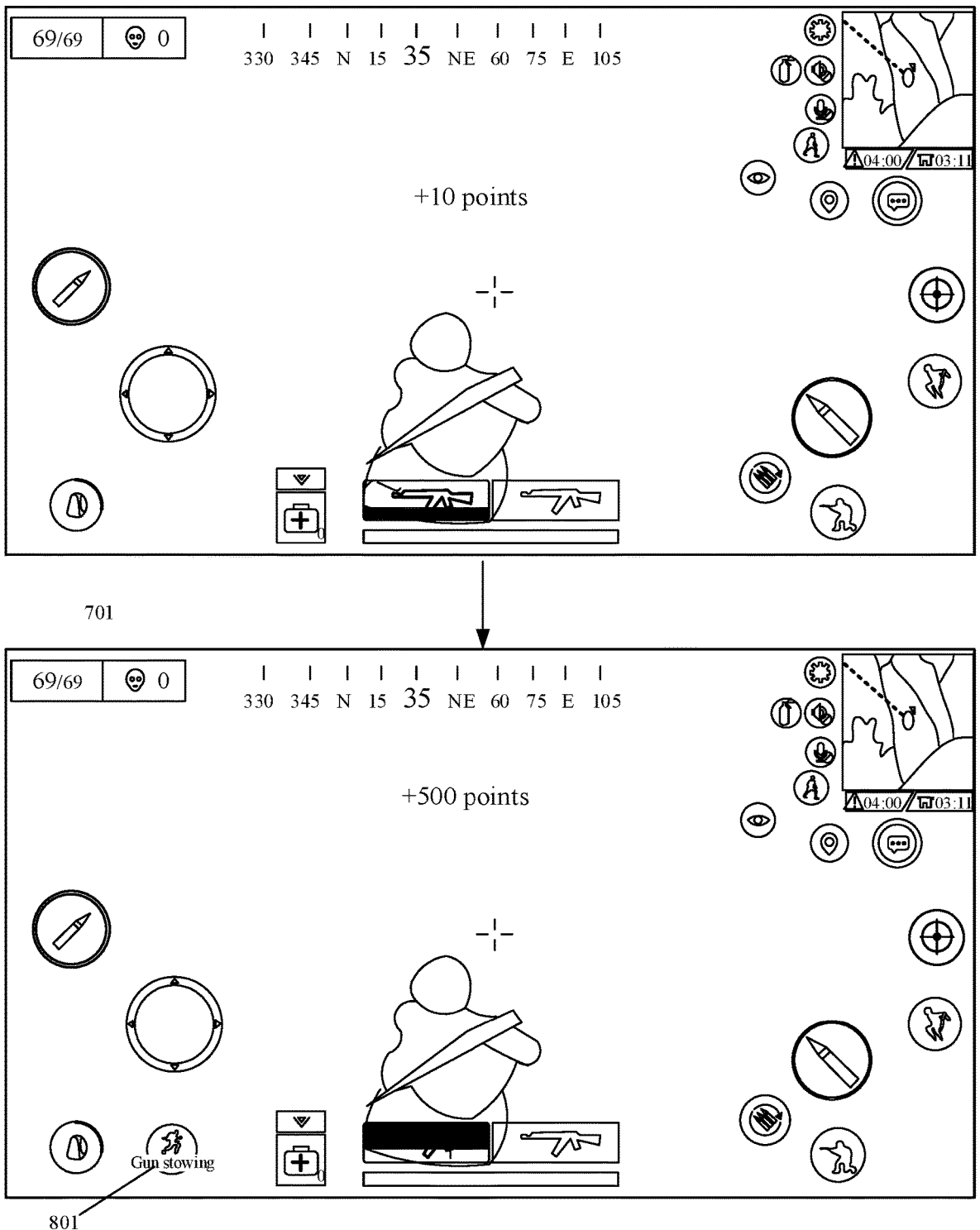
FIG. 8 is a schematic diagram of triggering a state switching control according to an embodiment of this application.

FIG. 8 is a schematic diagram of triggering a state switching control according to an embodiment of this application. When a score obtained by the virtual object in the virtual scene does not reach a target score (it is assumed that the target score is 500 points), no state switching control is displayed in the screen of the virtual scene. When the score obtained by the virtual object in the virtual scene reaches the target score, a state switching control 801 is displayed in the screen of the virtual scene for the user to trigger the state switching control 801 to implement switching operations for the motion state and the equipment state.

In some embodiments, the state switching control may alternatively be displayed only when the virtual object is in a specific motion state or the equipment state of the virtual item is a specific equipment state. The state switching control herein may be newly displayed. That is, the state switching control is not displayed when the virtual object is in a state other than the specific motion state or the equipment state of the virtual item is a state other than the specific equipment state. Only when the virtual object moves in the virtual scene in the specific motion state or is equipped with the virtual item in the specific equipment state, the state switching control is displayed. For example, when the virtual object is in a standing state, and the virtual item is in a storage state, the state switching control is not displayed. When a drag operation on the direction joystick control is received, and a drag distance reaches the target distance, the virtual object is controlled to move in a sprinting state, and the state switching control configured to switch the motion state of the virtual object and the equipment state of the virtual item is displayed.

In some embodiments, the terminal may display a state switching control for the virtual object in the following manner: displaying the state switching control for the virtual object using a first display style. Correspondingly, after controlling the motion state of the virtual object to switch from the first motion state to the second motion state, the terminal may display a state switching control for the virtual object in the following manner: displaying, in a process in which the virtual object moves in the second motion state, the state switching control using a second display style different from the first display style.

In an actual application, a display style of the state switching control in an inactive state is different from a display style of the state switching control in an active state. For example, the state switching controls in different states are distinguished using different display styles such as different display colors or different transparencies. Generally, the state switching control that is initially displayed in the screen is in an inactive state (that is, is unavailable), and the state switching control is displayed using a grayscale (that is, the first display style) in the screen of the virtual scene. When the user performs a press-and-hold operation the state switching control, for example, the press-and-hold operation lasts for 0.5 seconds, the state switching control is activated and displayed in a highlighted display style (that is, the second display style).

For example, in FIG. 6, before the state switching control 602 is activated, the state switching control 602 in an inactive state is displayed using a grayscale in the screen of the virtual scene, and after the state switching control 602 is activated, that is, the motion state of the virtual object and the equipment state of the virtual item can be switched by using the state switching control 602, the state switching control 602 is displayed in a highlighted display style in a process in which the virtual object moves in the motion state after the switching.

In some embodiments, the terminal may receive the first switching instruction for the virtual object in the following manner: obtaining, in response to the trigger operation being a press operation on the state switching control, at least one of the following press parameters corresponding to the press operation: a press duration, a press pressure, or a press frequency; and receiving the first switching instruction for the virtual object in a case that the press parameter satisfies a state switching condition.

A press operation that satisfies a state switching condition is used as an effective operation, and only the effective operation can trigger the first switching instruction for the virtual object.

In some embodiments, the terminal may receive the first switching instruction for the virtual object in the following manner: receiving a slide operation on the screen, and obtaining a slide trajectory corresponding to the slide operation; matching the slide trajectory with a target trajectory used for triggering the first switching instruction, to obtain a matching result; and receiving the first switching instruction for the virtual object in response to the matching result representing that the slide trajectory matches the target trajectory, or a matching degree (for example, a similarity) between the slide trajectory and the target trajectory reaches a target matching degree (a target similarity).

The target trajectory herein is a trajectory that is pre-stored in the virtual scene and that can trigger a switching instruction used for switching the motion state of the virtual object and the equipment state of the equipped virtual item. The target trajectory may be set according to an actual situation. When the user performs a slide operation on the screen of the virtual scene, the terminal obtains, in response to the slide operation, a slide trajectory corresponding to the slide operation, matches the obtained slide trajectory with the target trajectory, and determines, in response to the slide trajectory being consistent with the target trajectory or a matching degree between the two reaching a target matching degree (for example, a similarity between the two exceeds a similarity threshold), that the slide operation of the user can trigger the corresponding switching instruction.

Figure 9:
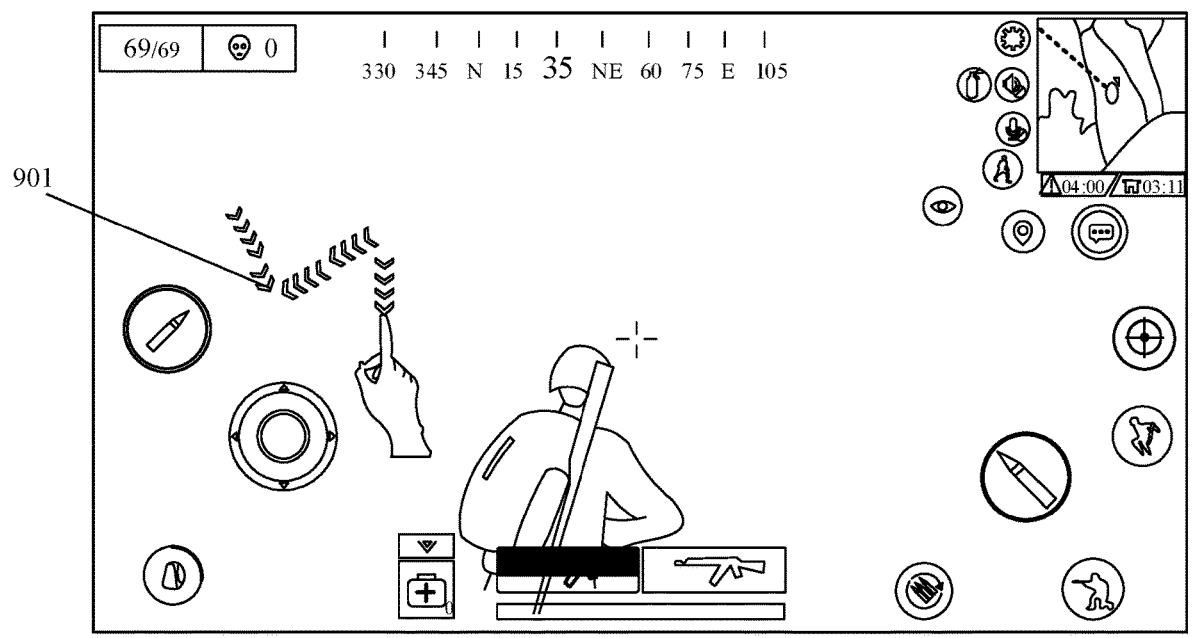
FIG. 9 is a schematic diagram of a slide trajectory according to an embodiment of this application.

FIG. 9 is a schematic diagram of a slide trajectory according to an embodiment of this application. A slide trajectory of the user for the screen of the virtual scene is a slide trajectory 901. The slide trajectory 901 is matched with a target trajectory used for triggering a switching instruction. When the matching succeeds, the corresponding switching instruction is triggered.

In some embodiments, the terminal may control the virtual object to switch an equipment state of the virtual item from the first equipment state to a second equipment state and control a motion state of the virtual object to switch from the first motion state to a second motion state in the following manner:

determining a scene category of the scene in which the virtual object is located; matching the first equipment state of the virtual item with the scene category, and matching the first motion state of the virtual object with the scene category; and controlling, in response to the first equipment state not matching the scene category, and the first motion state not matching the scene category, the equipment state of the virtual item of the virtual object to switch from the first equipment state to the second equipment state matching the scene category, and controlling the motion state of the virtual object from the first motion state to the second motion state matching the scene category.

The scene category may include, but is not limited to, the following scenes: a scene in the air, a scene in the water, a scene on the ground, a scene on the snowfield, or a scene with obstacles. When receiving a state switching instruction, the terminal obtains a scene category of the scene in which the virtual object is currently located. When the current motion state of the virtual object and the equipment state for the virtual item do not match the scene category of the scene in which the virtual object is currently located, the current motion state is switched to a motion state matching the current scene category, and switch the equipment state for the virtual item to an equipment state matching the current scene category.

For example, the virtual object "holds a gun and walks" in the virtual scene, that is, the first motion state is a walking state, and the first equipment state for the virtual item (that is, a gun) is a holding state. When receiving a state switching instruction, the terminal determines, according to a scene element, a scene in which the virtual object is currently located, for example, determines whether there is an obstacle in front of the movement of the virtual object, and when determining that there is an obstacle (for example, a wall) in front of the movement of the virtual object, controls the virtual object to "stow the gun and climb over the wall", that is, switches the motion state of the virtual object from the "walking state" to a "over-the-wall state" (that is, the second motion state) and switches the equipment state for the virtual item from the "holding state" to a "storage state" (that is, the second equipment state). In another example, the virtual object "walks while holding a gun" in the virtual scene. In event that terminal determines that the virtual object is in a snowy scene when receiving a state switching instruction, the terminal controls the virtual object to "stow the gun and tackle", that is, switches the motion state of the virtual object from the "walking state" to a "tackling state" (that is, the second motion state), and switches the equipment state for the virtual item from the "holding state" to a "storage state" (that is, the second equipment state, and so on.

In an actual application, after matching the first equipment state of the virtual item with the scene category and matching the first motion state of the virtual object with the scene category, if the matching result represents that one of the motion state of the virtual object of the virtual object or the equipment state of the virtual item matches the current scene category, but the other does not match the current scene category, only the state that does not match the current scene category is controlled to switch to a state matching the current scene category while keeping the state that matches the current scene category unchanged.

In some embodiments, before controlling the virtual object to switch the equipment state of the virtual item from the first equipment state to the second equipment state, the terminal may display a direction joystick control in the following manner: displaying the direction joystick control when the virtual object is in the first motion state. Correspondingly, after controlling the motion state of the virtual object to switch from the first motion state to the second motion state, the terminal may display a direction joystick control in the following manner: displaying a target state icon in a target region in a display region of the direction joystick control in a process in which the virtual object moves in the second motion state, the target state icon being configured to indicate that the virtual object is in the second motion state.

For example, in FIG. 6, when the virtual object is a "gun-holding and walking" state, the direction joystick control 603 configured to control a movement direction of the virtual object is displayed in the screen of the virtual scene, and after the virtual object is controlled to switch from "gun-holding and walking" to "gun-stowing and sprinting", that is, in a process in which the virtual object is sprinting, a target state icon 604 is displayed in the target region in the display region of the direction joystick control, to indicate that the virtual object is a sprinting motion state corresponding to the target state icon.

In some embodiments, after controlling the motion state of the virtual object to switch from the first motion state to the second motion state, the terminal may further perform the switching operation again in the following manner:

displaying a movement duration during which the virtual object moves in the second motion state; and controlling, in response to the movement duration reaching a target duration, the virtual object to switch the equipment state of the virtual item from the second equipment state to a third equipment state, and controlling the motion state of the virtual object to switch from the second motion state to a third motion state, so that the virtual object that is in the third motion state controls the virtual item that is in the third equipment state.

The third motion state may be the same as the first motion state or different from the first motion state. Similarly, the third equipment state may be the same as the first equipment state or different from the first equipment state. The terminal may control the virtual object in the virtual scene to switch back and forth between a plurality of different motion states, and control the virtual object to switch the equipment state for the virtual item back and forth between a plurality of different equipment states. For example, in the virtual scene, the virtual object moves in the "gun-holding and walking" state for 3 seconds, then switches to "gun-stowing and sprinting", and after moving in the "gun-stowing and sprinting" state in the virtual scene for 5 seconds, switches to the state "gun-holding and walking" again. In another example, in the virtual scene, the virtual object moves in the "gun-holding and walking" state for 3 seconds, then switches to "gun-stowing and sprinting", and after moving in the "gun-stowing and sprinting" state in the virtual scene for 5 seconds, switches to the state "gun-holding and tackling", and so on.

In an actual application, in addition to performing a state switching operation based on a state switching instruction triggered by a state switching control, a duration of each state may be further set. When the duration of the state reaches a target duration, the user does not need to trigger the state switching control, and the corresponding state switching instruction can still be triggered to perform the state switching operation.

Figure 10:
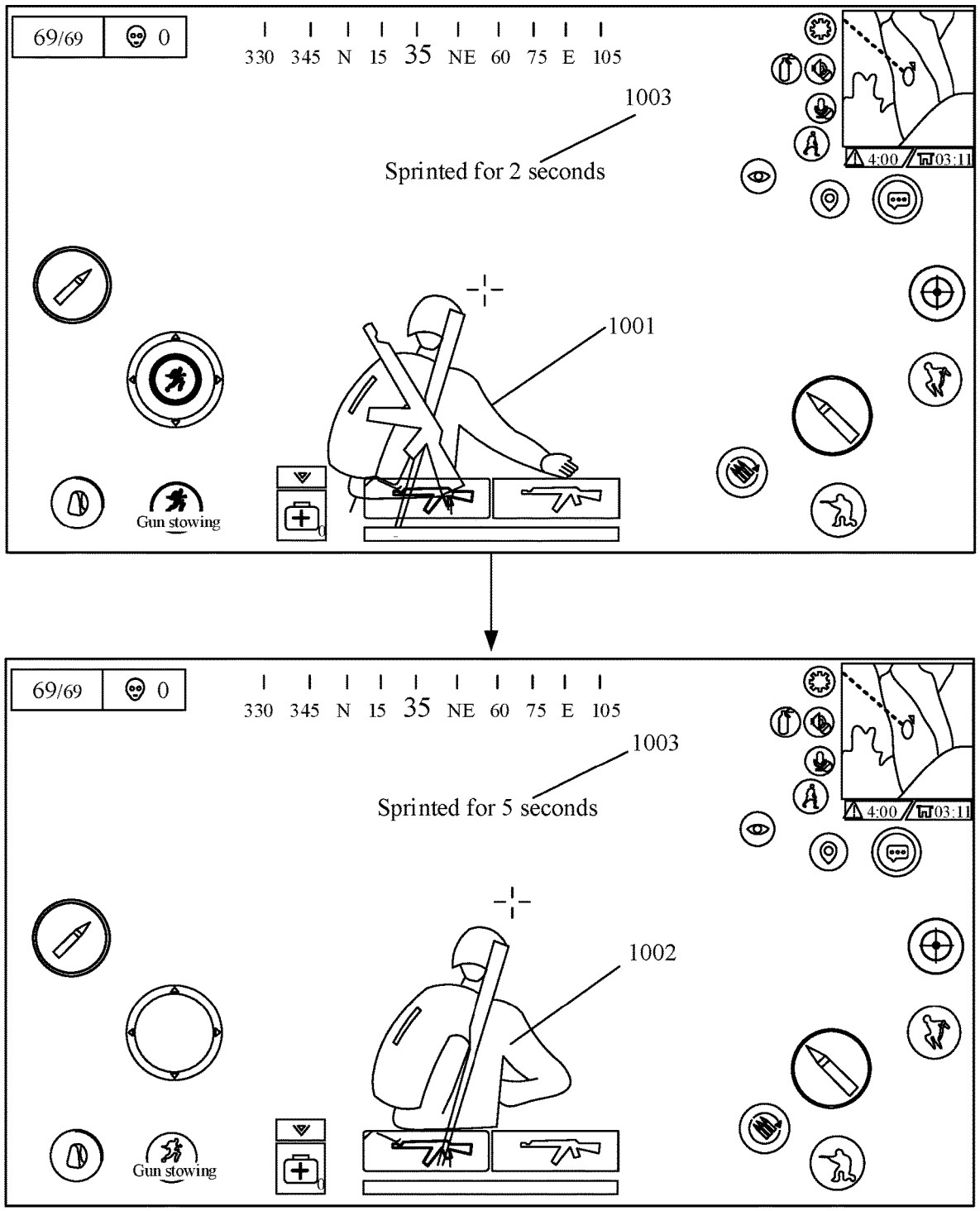
FIG. 10 is a schematic diagram of state switching according to an embodiment of this application.

FIG. 10 is a schematic diagram of state switching according to an embodiment of this application. A movement duration 1003 during which the virtual object moves in a "gun-stowing and sprinting" state 1001 (that is, the second motion state is a sprinting state and the second equipment state is a storage state) is displayed in the screen of the virtual scene. After the movement duration reaches a target duration (for example, 5 seconds), the state of the virtual object is automatically controlled to switch from the "gun-stowing and sprinting" state 1001 to a "gun-holding and walking" state 1002, that is, the motion state of the virtual object is automatically switched from a sprinting state to a walking state (that is, the third motion state), and the equipment state for the virtual item of the virtual object is switched from a storage state to a holding state (that is, the third equipment state).

In some embodiments, after controlling the motion state of the virtual object to switch from the first motion state to the second motion state, the terminal may further perform the switching operation again in the following manner: determining a movement distance by which the virtual object moves in the second motion state; controlling, in response to the movement distance reaching a target distance, the virtual object to switch the equipment state of the virtual item from the second equipment state to a fourth equipment state, and controlling the motion state of the virtual object to switch from the second motion state to a fourth motion state, so that the virtual object that is in the fourth motion state controls the virtual item that is in the fourth equipment state.

The fourth motion state may be the same as the first motion state or different from the first motion state, and similarly, the fourth equipment state may be the same as the first equipment state or different from the first equipment state. In an actual application, the target distance of a movement in the second motion state may be preset, that is, after the virtual object moves by the target distance in the second motion state, state switching is automatically performed. During actual implementation, the terminal may detect a distance by which the virtual object moves in the second motion state, and when the distance by which the virtual object moves in the second motion state reaches the target distance, controls the virtual object switch from the second motion state to the first motion state or another motion state, and controls the equipment state for the virtual item to switch from the second equipment state to the first equipment state or another equipment state.

Before a duration during which the virtual object moves in the second motion state reaches a target duration, or before a movement distance by which the virtual object moves in the second motion state reaches a target distance, the user may perform state switching manually.

In some embodiments, after controlling the motion state of the virtual object to switch from the first motion state to the second motion state, the terminal may display, in the following manner, indication information indicating a failure in switching:

receiving a second switching instruction for the virtual object in a process in which the virtual object moves in the second motion state, the second switching instruction being used for instructing to switch the motion state of the virtual object and the equipment state of the virtual item; obtaining an interaction level of the virtual object in the virtual scene; and displaying, in response to the second switching instruction when the interaction level does not reach a target level, indication information indicating a failure in switching the motion state of the virtual object and the equipment state of the virtual item.

When receiving the switching instruction again, the terminal obtains an interaction level of the virtual object in the virtual scene, and in response to the interaction level reaching a target level, controls the motion state of the virtual object to switch from the second motion state to the fourth motion state, and controls the virtual object to switch the equipment state for the virtual item from the second equipment state to the fourth equipment state. In event that the interaction level does not reach the target level, indication information indicating a failure in switching the motion state of the virtual object and the equipment state of the virtual item is displayed, to avoid the ecological imbalance of the virtual scene from being caused by over frequent state switching. When the switching instruction is received again, in addition to determining whether the interaction level of the virtual object reaches the target level required for switching, whether to perform a corresponding state switching operation is further determined by determining whether a duration of a switching instruction interval reaches a target duration or by determining whether a movement achievement of the virtual object reaches a target achievement.

Figure 11:
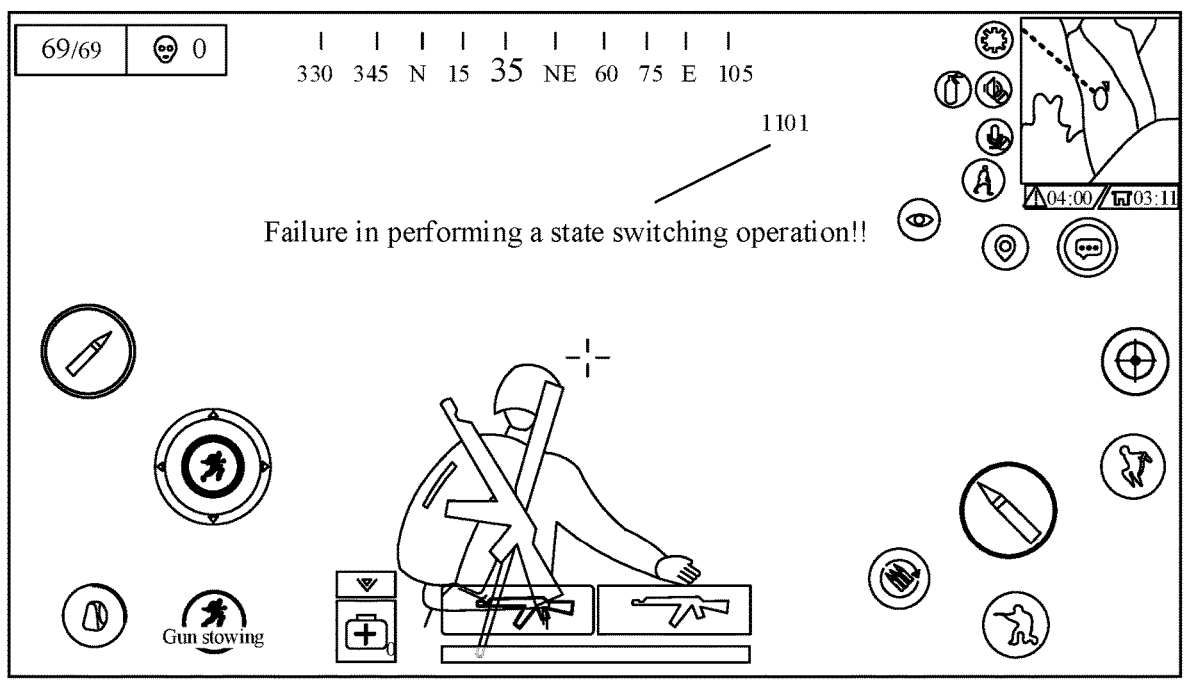
FIG. 11 is a schematic diagram of a switching instruction according to an embodiment of this application.

FIG. 11 is a schematic diagram of a switching instruction according to an embodiment of this application. In a process in which the virtual object moves in the second motion state, when receiving a state switching instruction and determining that an interaction level of the virtual object does not reach a target level at which a switching operation can be performed, the terminal displays indication information 1101 indicating a failure in performing the state switching operation to prompt the user that the motion state of the virtual object and the equipment state of the virtual item cannot be switched at the current interaction level.

In the foregoing manners, in the embodiments of this application, in response to a first switching instruction for a virtual object, the virtual object is controlled to switch an equipment state of a virtual item from an original first equipment state to a second equipment state, and a motion state of the virtual object is controlled to switch from the first motion state to a second motion state, so that the virtual object that is in the second motion state controls the virtual item that is in the second equipment state. When a second switching instruction for the virtual object is received, the virtual object may further be controlled to switch an equipment state of the virtual item from the second equipment state to a third equipment state, and a motion state of the virtual object is controlled to switch from the second motion state to a third motion state. In this way, in a case that the terminal receives one switching instruction, simultaneous switching of the motion state of the virtual object and the equipment state of the virtual item can be controlled, which, compared with that each switching instruction can perform a switching operation on only one state, can improve the efficiency of state switching of the virtual object and the virtual item, thereby reducing a quantity of times of interaction required for achieving an interaction objective, improving the efficiency of human-machine interaction, and reducing occupation of hardware processing resources.

Figure 12:
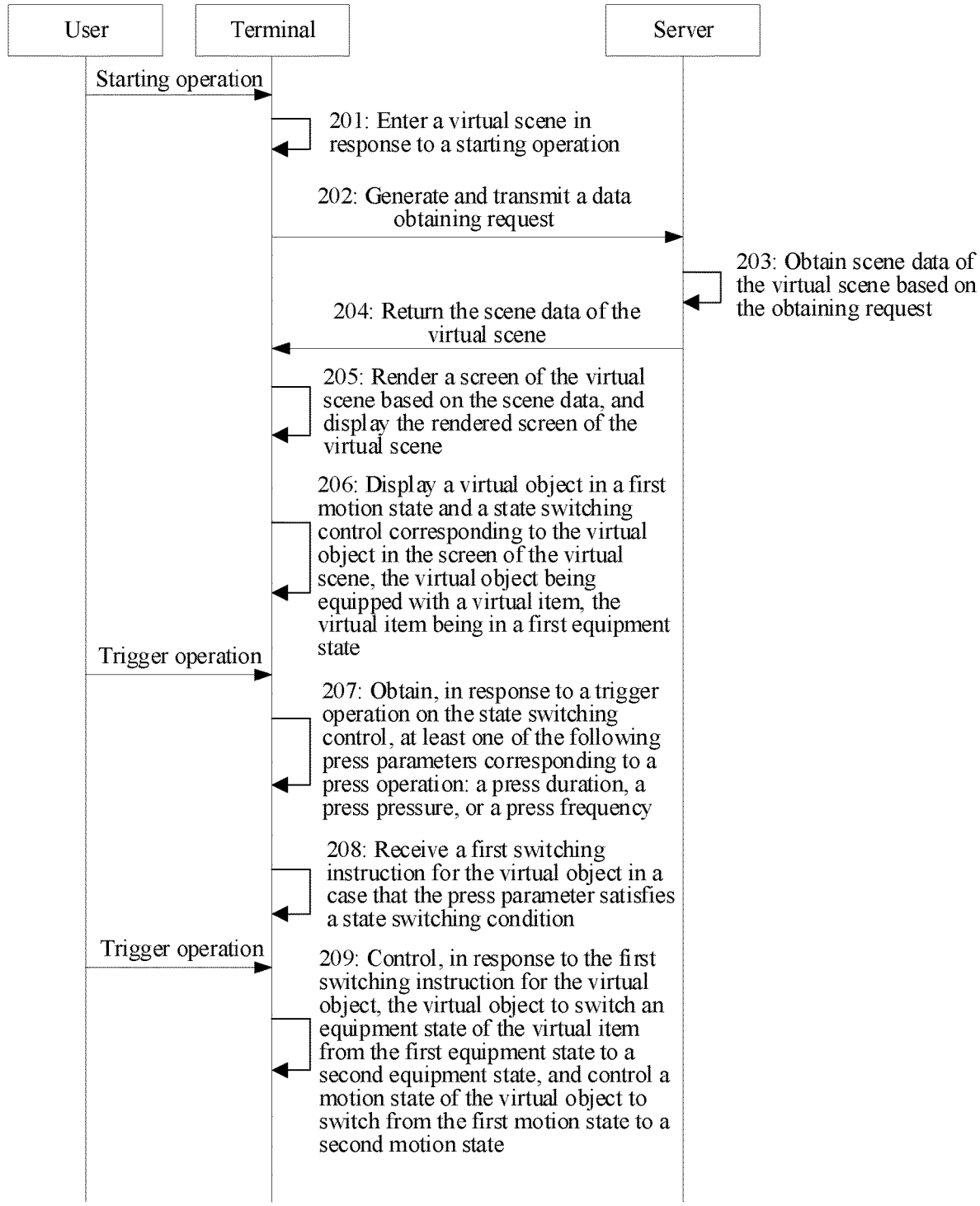
FIG. 12 is a schematic flowchart of a method for state switching in a virtual scene according to an embodiment of this application.

The method for state switching in a virtual scene provided in this embodiment of this application is further described below. The method for state switching in a virtual scene is implemented by both a terminal and a server. FIG. 12 is a schematic flowchart of a method for state switching in a virtual scene according to an embodiment of this application. Referring to FIG. 12, the method for state switching in a virtual scene provided in this embodiment of this application includes the following steps:

Step 201: The terminal, in response to a starting operation on a virtual scene, enters the virtual scene.

Step 202: The terminal generates and transmits a request for obtaining scene data of the virtual scene to the server.

Step 203: The server obtains the scene data of the virtual scene based on the received request for obtaining the scene data.

Step 204: The server returns the scene data of the virtual scene to the terminal.

Step 205: The terminal renders a screen of the virtual scene based on the received scene data, and displays the screen of the virtual scene.

Step 206: The terminal displays a virtual object in a first motion state and a state switching control corresponding to the virtual object in the screen of the virtual scene, the virtual object being equipped with a virtual item, the virtual item being in a first equipment state.

Step 207: The terminal obtains, in response to a trigger operation on the state switching control, at least one of the following press parameters corresponding to a press operation: a press duration, a press pressure, or a press frequency.

Step 208: The terminal receives a first switching instruction for the virtual object in response to the press parameter satisfying a state switching condition.

Step 209: The terminal controls, in response to a first switching instruction for the virtual object, the virtual object to switch an equipment state of the virtual item from the first equipment state to a second equipment state, and controls a motion state of the virtual object to switch from the first motion state to a second motion state, so that the virtual object that is in the second motion state controls the virtual item that is in the second equipment state.

The following describes an exemplary application of this embodiment of this application in an actual application scenario.

Figure 13:
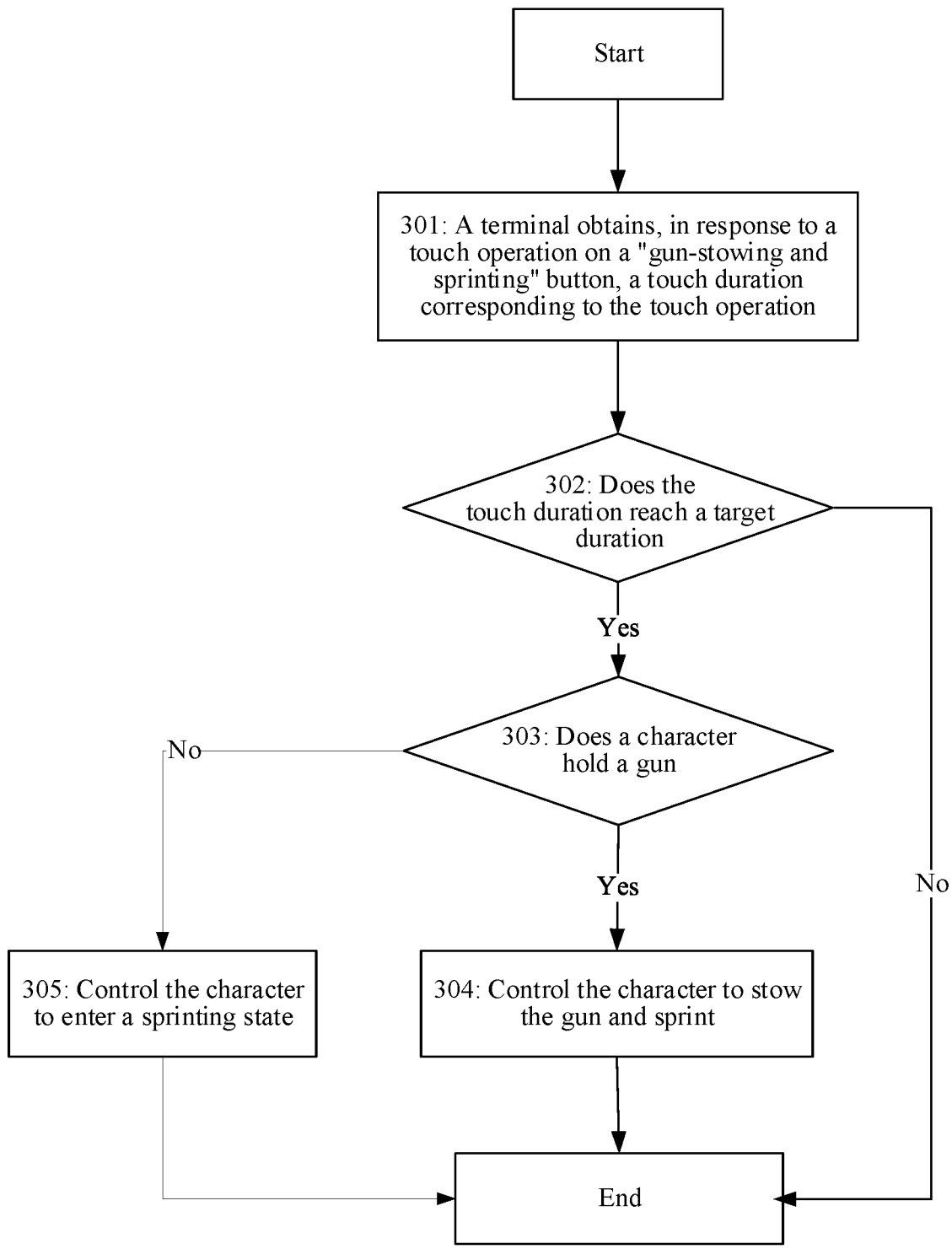
FIG. 13 is a schematic flowchart of a method for state switching in a virtual scene according to an embodiment of this application.

Using a virtual scene being a shooting game on a mobile device side as an example, FIG. 13 is a schematic flowchart of a method for state switching in a virtual scene according to an embodiment of this application. Referring to FIG. 13, the method for state switching in a virtual scene provided in this embodiment of this application includes the following steps:

Step 301: A terminal obtains, in response to a touch operation on a "gun-stowing and sprinting" button, a touch duration corresponding to the touch operation.

In the shooting game on the mobile device side, a game interface displays a character (that is, the foregoing virtual object) that is selected by a player and that currently holds a gun (that is, the foregoing virtual item) in hand and the "gun-stowing and sprinting" button (that is, the foregoing state switching control) for switching a motion state and a gun-holding state of the character. When the player touches the "gun-stowing and sprinting" button, the terminal detects a touch gesture corresponding to the touch operation. A touch manner for the button may be at least one of a tap, a double-tap, a press-and-hold, or a slide.

Figure 14A:
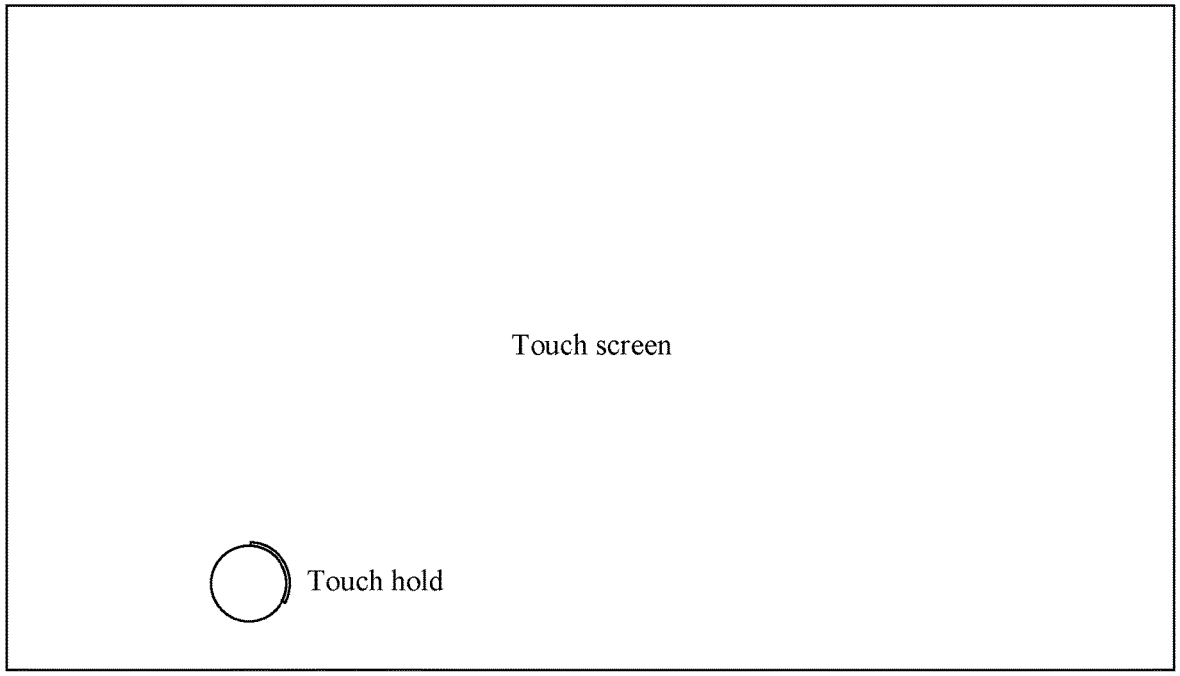
FIG. 14A is a schematic diagram of trigger detection according to an embodiment of this application.
Figure 14B:
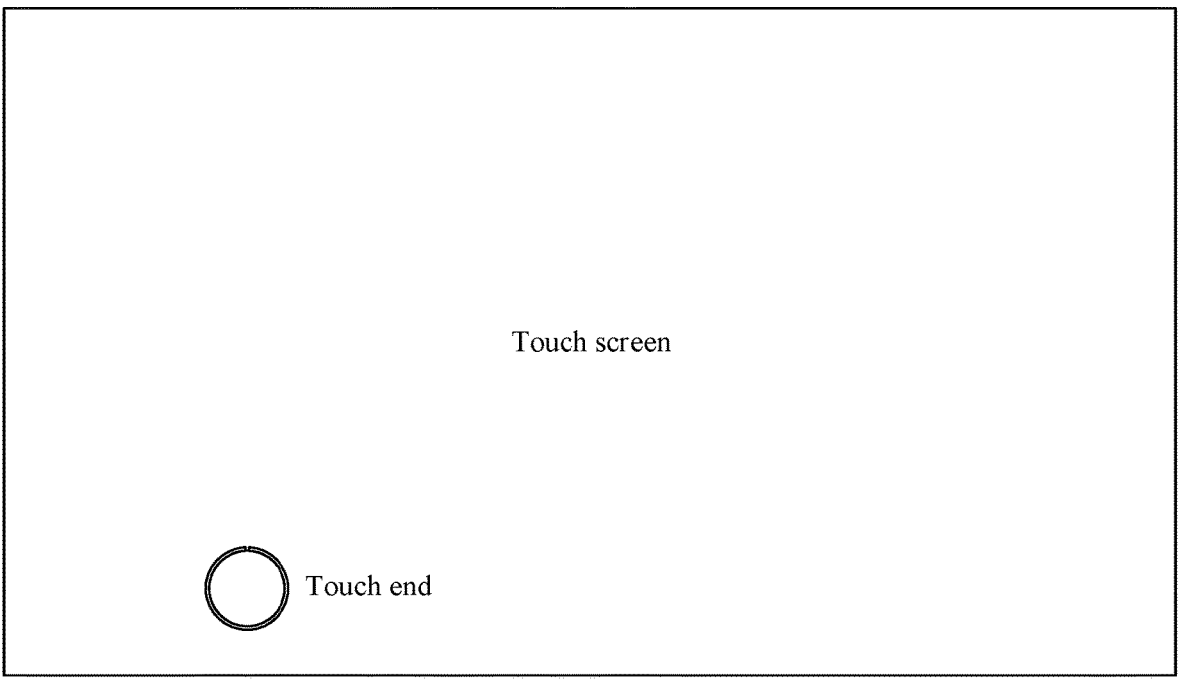
FIG. 14B is another schematic diagram of trigger detection according to an embodiment of this application.

FIG. 14A and FIG. 14B are schematic diagrams of trigger detection according to an embodiment of this application. When the "gun-stowing and sprinting" button on a touch-screen of the mobile device is touched, the terminal detects a touch operation. Two events, touch hold and touch end, need to be detected, where touch hold is a trigger event when the touch starts, and touch end is a trigger event when the touch ends. After acquiring trigger event data for the "gun-stowing and sprinting" button, a processor determines whether the touch duration reaches a target duration.

Step 302: Determine whether the touch duration reaches a target duration.

If the touch duration reaches the target duration, it can be determined that the touch operation is a press-and-hold operation, that is, a progress bar corresponding to the "gun-stowing and sprinting" button is filled up with the progress, a condition for performing the switching operation is satisfied, and step 303 is performed. If the touch duration does not reach the target duration, the procedure is ended.

Step 303: Determine whether the character holds a gun.

If the character currently holds a gun, step 304 is performed. If the character currently does not hold a gun, step 305 is performed.

Step 304: Control the character to stow the gun and sprint.

If the character currently holds a gun, an equipment state of the gun with which the character is equipped is in a holding state (that is, the first equipment state), and a motion state of the character is a static state or a walking state (that is, the first motion state), when a state switching instruction triggered by a touch on the "gun-stowing and sprinting" button is received, the character is controlled to switch the equipment state for the gun from the holding state to a storage state (that is, the second equipment state), and at the same time, switch the motion state of the character from the static state or walking state to a sprinting state (that is, the second motion state), so that character sprints faster in an empty-handed state.

Step 305: Control the character to enter a sprinting state.

If the character currently does not hold a gun, when a state switching instruction triggered by a touch on the "gun-stowing and sprinting" button is received, the character is controlled to directly enter the sprinting state.

When the character is in the sprinting state, the "gun-stowing and sprinting" button is in a highlighted state, and a sprinting state icon is displayed in the target region in the display region of the direction joystick control. When the player taps the "gun-stowing and sprinting" button again, the gun-holding state (which is the same as the state before the "gun-stowing and sprinting" state) and the walking state are restored, and the "gun-stowing and sprinting" button returns to a normal state.

In the method for state switching in a virtual scene provided in this embodiment of this application, a press-and-hold operation may be performed on the "gun-stowing and sprinting" button to cause the character to stow the gun and enter the sprinting state. In this way, the sprinting is combined with stowing a gun. By performing the press-and-hold operation on the "gun-stowing and sprinting" button, the player can complete two-step switching operations at a time, which, compared with the original multi-stage operations of sliding a direction joystick control to enter the sprinting state after tapping the item bar to stow the gun, is more convenient, reduces operation costs, and improves the operation efficiency. In addition, the switching method provided in this embodiment of this application is suitable for a shooting game with a large topographic relief and fast character movement. This convenient operation is more in line with the parkour experience on a map, and brings a better user experience to the player.

Figure 15:
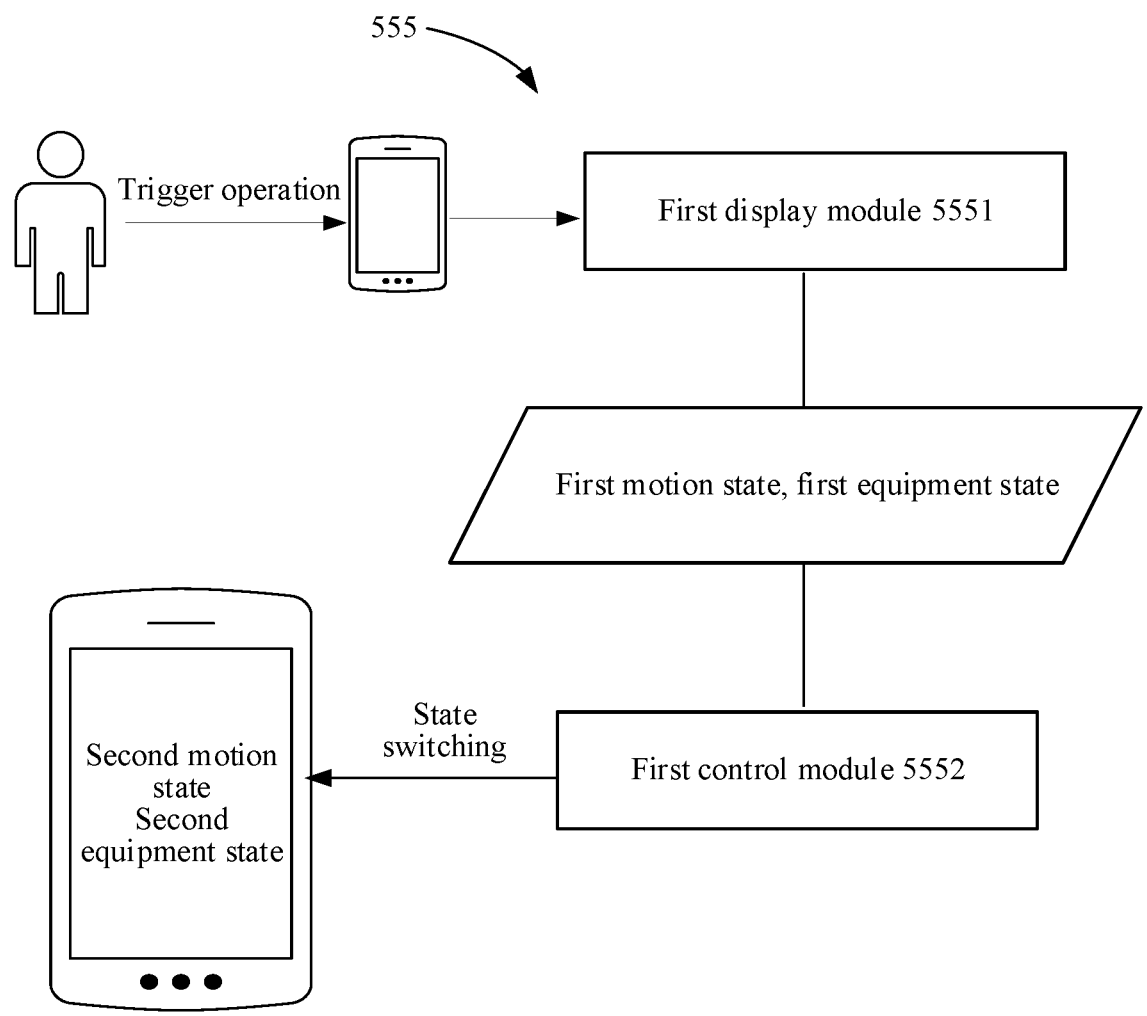
FIG. 15 is a schematic structural diagram of an apparatus for state switching in a virtual scene according to an embodiment of this application.

An exemplary structure of an apparatus 555 for state switching in a virtual scene provided in this embodiment of this application and implemented as a software module is further described below. FIG. 15 is a schematic structural diagram of an apparatus for state switching in a virtual scene according to an embodiment of this application. The apparatus 555 for state switching in a virtual scene provided in this embodiment of this application may include:

a first display module 5551, configured to display a virtual object in a first motion state in a screen of a virtual scene, the virtual object being equipped with a virtual item, the virtual item being in a first equipment state; and a first control module 5552, configured to control, in response to a first switching instruction for the virtual object, the virtual object to switch an equipment state of the virtual item from the first equipment state to a second equipment state, and control a motion state of the virtual object to switch from the first motion state to a second motion state, so that the virtual object that is in the second motion state controls the virtual item that is in the second equipment state.

In some embodiments, before the displaying a virtual object in a first motion state in a screen of a virtual scene, the apparatus further includes:

a second control module, configured to display a direction joystick control in the screen of the virtual scene;

obtain, in response to a drag operation on the direction joystick control, a drag position corresponding to the drag operation; and control, in response to the drag position being located at a target position, the virtual object to be in the first motion state.

In some embodiments, before the controlling the virtual object to switch an equipment state of the virtual item from the first equipment state to a second equipment state, the apparatus further includes:

a second display module, configured to display a state switching control for the virtual object; and an instruction receiving module, configured to receive the first switching instruction for the virtual object in response to a trigger operation on the state switching control.

In some embodiments, the second display module is configured to display, in the screen of the virtual scene, the direction joystick control configured to control the motion state of the virtual object and the equipment state of the virtual item; and display, in response to the drag operation on the direction joystick control, the state switching control for the virtual object when a drag distance corresponding to the drag operation reaches a target distance.

In some embodiments, the second display module is further configured to display an achievement achieved by the virtual object in the virtual scene; and display the state switching control for the virtual object in response to the achievement reaching an achievement threshold.

In some embodiments, the second display module is further configured to display the state switching control for the virtual object using a first display style.

After the controlling a motion state of the virtual object to switch from the first motion state to a second motion state, the second display module is further configured to display, in a process in which the virtual object moves in the second motion state, the state switching control using a second display style different from the first display style.

In some embodiments, the instruction receiving module is further configured to obtain, when the trigger operation is a press operation on the state switching control, at least one of the following press parameters corresponding to the press operation: a press duration, a press pressure, or a press frequency; and receive the first switching instruction for the virtual object in response to the press parameter satisfying a state switching condition.

In some embodiments, the instruction receiving module is further configured to receive a slide operation on the screen, and obtaining a slide trajectory corresponding to the slide operation;

match the slide trajectory with a target trajectory used for triggering the first switching instruction, to obtain a matching result; and receive the first switching instruction for the virtual object in response to the matching result representing that the slide trajectory matches the target trajectory.

In some embodiments, the first control module is configured to determine a scene category of the scene in which the virtual object is located;

match the first equipment state of the virtual item with the scene category, and match the first motion state of the virtual object with the scene category; and control, in response to the first equipment state not matching the scene category, and the first motion state not matching the scene category, the equipment state of the virtual item of the virtual object to switch from the first equipment state to the second equipment state matching the scene category, and control the motion state of the virtual object from the first motion state to the second motion state matching the scene category.

In some embodiments, before the controlling the virtual object to switch an equipment state of the virtual item from the first equipment state to a second equipment state, the apparatus further includes:

a third display module, configured to display a direction joystick control in when the virtual object is in the first motion state.

Correspondingly, after the controlling a motion state of the virtual object to switch from the first motion state to a second motion state, the third display module is further configured to display a target state icon in a target region in a display region of the direction joystick control in a process in which the virtual object moves in the second motion state, the target state icon being configured to indicate that the virtual object is in the second motion state.

In some embodiments, after the controlling a motion state of the virtual object to switch from the first motion state to a second motion state, the apparatus further includes:

a third control module, configured to display a movement duration during which the virtual object moves in the second motion state; and control, in response to the movement duration reaching a target duration, the virtual object to switch the equipment state of the virtual item from the second equipment state to a third equipment state, and control the motion state of the virtual object to switch from the second motion state to a third motion state, so that the virtual object that is in the third motion state controls the virtual item that is in the third equipment state.

In some embodiments, after the controlling a motion state of the virtual object to switch from the first motion state to a second motion state, the apparatus further includes:

a prompting module, configured to receive a second switching instruction for the virtual object in a process in which the virtual object moves in the second motion state, the second switching instruction being used for instructing to switch the motion state of the virtual object and the equipment state of the virtual item;

obtain an interaction level of the virtual object in the virtual scene; and display, in response to the second switching instruction in response to the interaction level not reaching a target level, indication information indicating a failure in switching the motion state of the virtual object and the equipment state of the virtual item.

An embodiment of this application provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the foregoing method for state switching in a virtual scene in the embodiments of this application.

An embodiment of this application provides a computer-readable storage medium storing an executable instruction. When the executable instruction is executed by a processor, the processor is caused to perform the method for state switching in a virtual scene in the embodiments of this application.

In some embodiments, the computer-readable storage medium may be a memory such as a ferroelectric random access memory (FRAM), a read-only memory (ROM), a programmable ROM (PROM), an erasable programmable ROM (EPROM), an electrically erasable programmable ROM (EEPROM), a flash memory, a magnetic surface memory, an optical disk, or a compact disc ROM (CD-ROM), or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a Hypertext Markup Language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. A method for state switching in a virtual scene, performed by an electronic device, the method comprising:

displaying a virtual object in a first motion state in a screen of a virtual scene, the virtual object being equipped with a virtual item, the virtual item being in a first equipment state;

displaying a state switching control for the virtual object;

receiving a first switching instruction for the virtual object in response to only a single input operation on the state switching control; and controlling, in response to the first switching instruction for the virtual object, the virtual object to switch an equipment state of the virtual item from the first equipment state to a second equipment state, and controlling a motion state of the virtual object to switch from the first motion state to a second motion state, so that the virtual object that is in the second motion state controls the virtual item that is in the second equipment state.

2. The method according to claim 1, wherein before the displaying the virtual object in the first motion state in the screen of the virtual scene, the method further comprises:
displaying a direction joystick control in the screen of the virtual scene;
obtaining, in response to a drag operation on the direction joystick control, a drag position corresponding to the drag operation; and
controlling, in response to the drag position being located at a target position, the virtual object to be in the first motion state.

3. The method according to claim 1, wherein the displaying the state switching control for the virtual object comprises:
displaying, in the screen of the virtual scene, a direction joystick control configured to control the motion state of the virtual object and the equipment state of the virtual item; and
displaying, in response to a drag operation on the direction joystick control, the state switching control for the virtual object when a drag distance corresponding to the drag operation reaches a target distance.

4. The method according to claim 1, wherein the displaying the state switching control for the virtual object comprises:
displaying an achievement obtained by the virtual object in the virtual scene; and
displaying the state switching control for the virtual object in response to the achievement reaching an achievement threshold.

5. The method according to claim 1, wherein the displaying the state switching control for the virtual object comprises:
displaying the state switching control for the virtual object using a first display style; and
after the controlling the motion state of the virtual object to switch from the first motion state to the second motion state, the method further comprises:
displaying, in a process in which the virtual object moves in the second motion state, the state switching control using a second display style different from the first display style.

6. The method according to claim 1, wherein the receiving the first switching instruction for the virtual object in response to the trigger operation on the state switching control comprises:
obtaining, in response to the trigger operation being a press operation on the state switching control, at least one of the following press parameters corresponding to the press operation: a press duration, a press pressure, or a press frequency; and
receiving the first switching instruction for the virtual object in response to the press parameter satisfying a state switching condition.

7. The method according to claim 1, wherein the receiving the first switching instruction for the virtual object in response to the trigger operation on the state switching control comprises:
receiving a slide operation on the screen, and obtaining a slide trajectory corresponding to the slide operation;
matching the slide trajectory with a target trajectory used to trigger the first switching instruction, to obtain a matching result; and
receiving the first switching instruction for the virtual object in response to the matching result representing that the slide trajectory matches the target trajectory.

8. The method according to claim 1, wherein the controlling the virtual object to switch the equipment state of the virtual item from the first equipment state to the second equipment state, and controlling the motion state of the virtual object to switch from the first motion state to the second motion state comprises:
determining a scene category of a scene in which the virtual object is located;
matching the first equipment state of the virtual item with the scene category, and matching the first motion state of the virtual object with the scene category; and
controlling, in response to the first equipment state not matching the scene category and the first motion state not matching the scene category, the equipment state of the virtual item of the virtual object to switch from the first equipment state to the second equipment state matching the scene category, and controlling the motion state of the virtual object from the first motion state to the second motion state matching the scene category.

9. The method according to claim 1, wherein before the controlling the virtual object to switch the equipment state of the virtual item from the first equipment state to the second equipment state, the method further comprises:
displaying a direction joystick control in response to the virtual object being in the first motion state; and
after the controlling the motion state of the virtual object to switch from the first motion state to the second motion state, the method further comprises:
displaying a target state icon in a target region in a display region of the direction joystick control in a process in which the virtual object moves in the second motion state, the target state icon being configured to indicate that the virtual object is in the second motion state.

10. The method according to claim 1, wherein after the controlling the motion state of the virtual object to switch from the first motion state to the second motion state, the method further comprises:
displaying a movement duration during which the virtual object moves in the second motion state; and
controlling, in response to the movement duration reaching a target duration, the virtual object to switch the equipment state of the virtual item from the second equipment state to a third equipment state, and controlling the motion state of the virtual object to switch from the second motion state to a third motion state, so that the virtual object that is in the third motion state controls the virtual item that is in the third equipment state.

11. The method according to claim 1, wherein after the controlling the motion state of the virtual object to switch from the first motion state to the second motion state, the method further comprises:
receiving a second switching instruction for the virtual object in a process in which the virtual object moves in the second motion state, the second switching instruction used to instruct to switch the motion state of the virtual object and the equipment state of the virtual item;
obtaining an interaction level of the virtual object in the virtual scene; and
displaying, in response to the second switching instruction when the interaction level does not reach a target level, indication information indicating a failure in switching the motion state of the virtual object and the equipment state of the virtual item.

12. An apparatus for state switching in a virtual scene, comprising:
a memory storing a plurality of instructions; and
a processor configured to execute the plurality of instructions, and upon execution of the plurality of instructions, is configured to:
display, via a display, a virtual object in a first motion state in a screen of a virtual scene, the virtual object being equipped with a virtual item, the virtual item being in a first equipment state;
display, via the display, a state switching control for the virtual object;
receive a first switching instruction for the virtual object in response to only a single input operation on the state switching control; and
control, in response to the first switching instruction for the virtual object, the virtual object to switch an equipment state of the virtual item from the first equipment state to a second equipment state, and control a motion state of the virtual object to switch from the first motion state to a second motion state, so that the virtual object that is in the second motion state controls the virtual item that is in the second equipment state.

13. The apparatus according to claim 12, wherein before the display of the virtual object in the first motion state in the screen of the virtual scene, the processor, upon execution of the plurality of instructions, is further configured to:
display, via the display, a direction joystick control in the screen of the virtual scene;
obtain, in response to a drag operation on the direction joystick control, a drag position corresponding to the drag operation; and
control, in response to the drag position being located at a target position, the virtual object to be in the first motion state.

14. The apparatus according to claim 12, wherein in order to control the virtual object to switch the equipment state of the virtual item from the first equipment state to the second equipment state, and control the motion state of the virtual object to switch from the first motion state to the second motion state, the processor, upon execution of the plurality of instructions, is configured to:
determine a scene category of a scene in which the virtual object is located;
match the first equipment state of the virtual item with the scene category, and match the first motion state of the virtual object with the scene category; and
control, in response to the first equipment state not matching the scene category and the first motion state not matching the scene category, the equipment state of the virtual item of the virtual object to switch from the first equipment state to the second equipment state matching the scene category, and control the motion state of the virtual object from the first motion state to the second motion state matching the scene category.

15. A non-transitory computer-readable storage medium storing a plurality of instructions executable by a processor, that when executed by the processor, cause the processor to:
display, via a display, a virtual object in a first motion state in a screen of a virtual scene, the virtual object being equipped with a virtual item, the virtual item being in a first equipment state;
control, in response to a first switching instruction for the virtual object, the virtual object to switch an equipment state of the virtual item from the first equipment state to a second equipment state, and control a motion state of the virtual object to switch from the first motion state to a second motion state, so that the virtual object that is in the second motion state controls the virtual item that is in the second equipment state;
after control of the motion state of the virtual object to switch from the first motion state to the second motion state, display, via the display, a movement duration during which the virtual object moves in the second motion state; and
control, in response to the movement duration reaching a target duration, the virtual object to switch the equipment state of the virtual item from the second equipment state to a third equipment state, and control the motion state of the virtual object to switch from the second motion state to a third motion state, so that the virtual object that is in the third motion state controls the virtual item that is in the third equipment state.

16. The non-transitory computer-readable storage medium according to claim 15, wherein before control of the virtual object to switch the equipment state of the virtual item from the first equipment state to the second equipment state, the plurality of instructions, when executed by the processor, further cause the processor to:
display, via the display, a direction joystick control in response to the virtual object being in the first motion state; and
after control of the motion state of the virtual object to switch from the first motion state to the second motion state, display, via the display, a target state icon in a target region in a display region of the direction joystick control in a process in which the virtual object moves in the second motion state, the target state icon being configured to indicate that the virtual object is in the second motion state.

17. The non-transitory computer-readable storage medium according to claim 15, wherein after the control of the motion state of the virtual object to switch from the first motion state to the second motion state, the plurality of instructions, when executed by the processor, further cause the processor to:
receive a second switching instruction for the virtual object in a process in which the virtual object moves in the second motion state, the second switching instruction used to instruct to switch the motion state of the virtual object and the equipment state of the virtual item;
obtain an interaction level of the virtual object in the virtual scene; and
in response to the second switching instruction when the interaction level does not reach a target level, display, via the display, indication information indicating a failure in switching the motion state of the virtual object and the equipment state of the virtual item.

* * * * *